(12) United States Patent
Crean

(10) Patent No.: US 7,287,806 B1
(45) Date of Patent: Oct. 30, 2007

(54) SLIDE-OUT LIFTING AND LOWERING MECHANISM

(75) Inventor: Johnnie R. Crean, Chino, CA (US)

(73) Assignee: Alfa Leisure, Inc., Ontario, CA (US)

( * ) Notice: Subject to any disclaimer, the term of this patent is extended or adjusted under 35 U.S.C. 154(b) by 0 days.

(21) Appl. No.: 11/417,568

(22) Filed: May 3, 2006

Related U.S. Application Data

(62) Division of application No. 10/773,560, filed on Feb. 5, 2004, now Pat. No. 7,066,528.

(60) Provisional application No. 60/446,186, filed on Feb. 5, 2003.

(51) Int. Cl.
*B60P 3/34* (2006.01)
(52) U.S. Cl. .................... 296/165; 296/26.13
(58) Field of Classification Search ............ 296/26.01, 296/26.03, 26.12, 26.13, 165, 171, 172, 175
See application file for complete search history.

(56) References Cited

U.S. PATENT DOCUMENTS

| | | | | |
|---|---|---|---|---|
| 5,788,306 A | * | 8/1998 | DiBiagio et al. | 296/26.02 |
| 5,984,396 A | * | 11/1999 | Schneider | 296/26.14 |
| 6,637,794 B2 | * | 10/2003 | McManus et al. | 296/26.01 |
| 7,011,351 B1 | | 3/2006 | Crean | |
| 7,066,517 B1 | | 6/2006 | Crean | |

OTHER PUBLICATIONS

U.S. Appl. No. 11/373,067, filed Mar. 10, 2006, Crean.
U.S. Appl. No. 11/420,211, filed May 24, 2006, Crean.
U.S. Appl. No. 11/420,216, filed May 24, 2006, Crean.
U.S. Appl. No. 11/420,415, filed May 25, 2006, Crean.

* cited by examiner

*Primary Examiner*—Dennis H. Pedder
(74) *Attorney, Agent, or Firm*—Knobbe, Martens, Olson & Bear, LLP

(57) ABSTRACT

A recreational vehicle having a slide-out housing, wherein the slide-out housing may be positioned in either a retracted or deployed configuration. In the deployed configuration, the slide-out housing extends outwardly from a main housing of the recreational vehicle so as to enlarge the living space within the main housing. In the retracted configuration, the slide-out housing extends inwardly into the main housing so as to reduce the living space within the main housing. In various embodiments, the slide-out housing is lifted prior to retraction and lowered after deployment so that the floor of the slide-out housing aligns with the floor of the main housing. In other various embodiments, vertical movement of the slide-out housing may occur during retraction and deployment. Moreover, the recreational vehicle may utilize a vertical actuating assembly, as disclosed herein, that is adapted to engage with the slide-out housing to thereby lift and lower the slide-out housing.

8 Claims, 24 Drawing Sheets

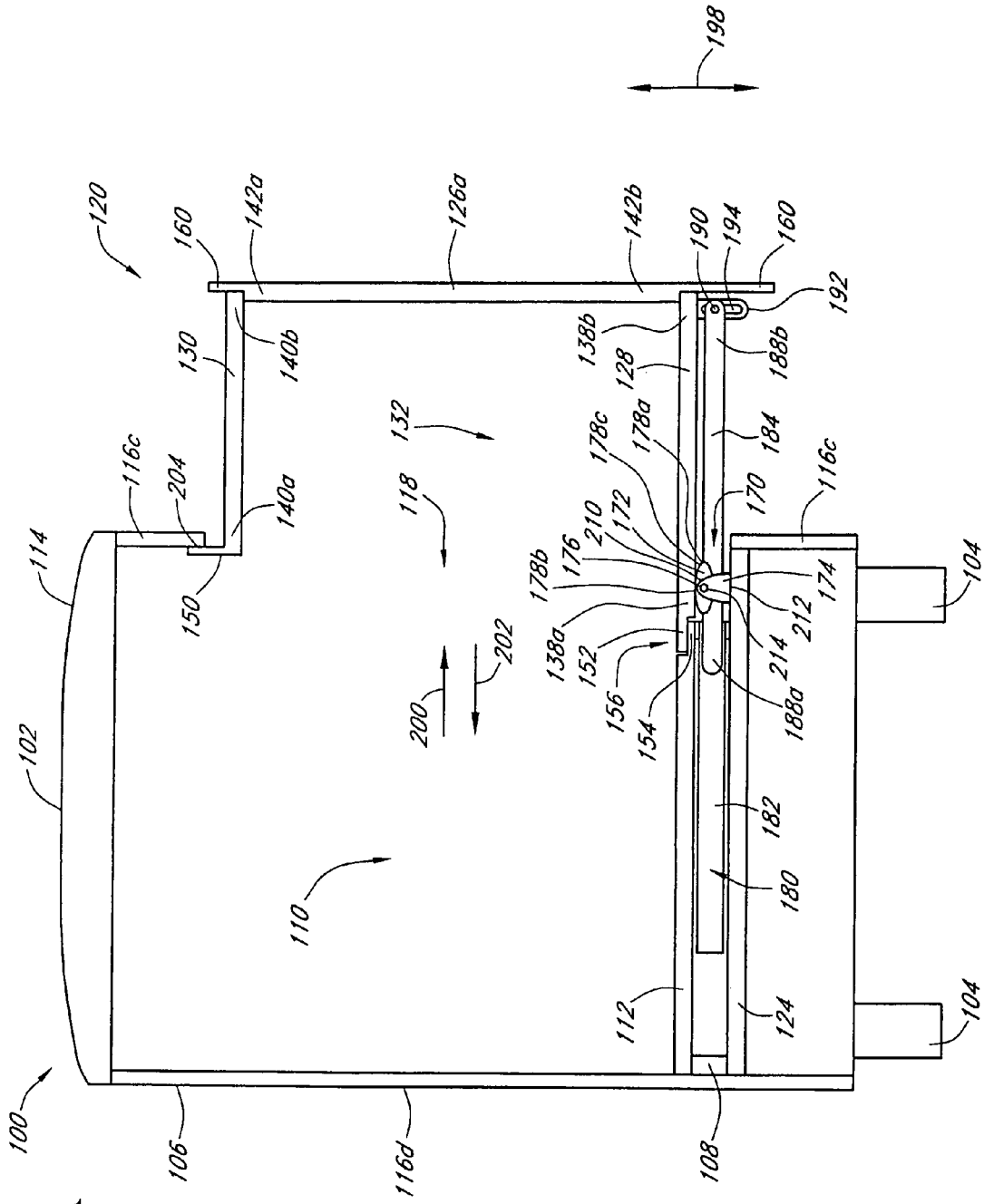

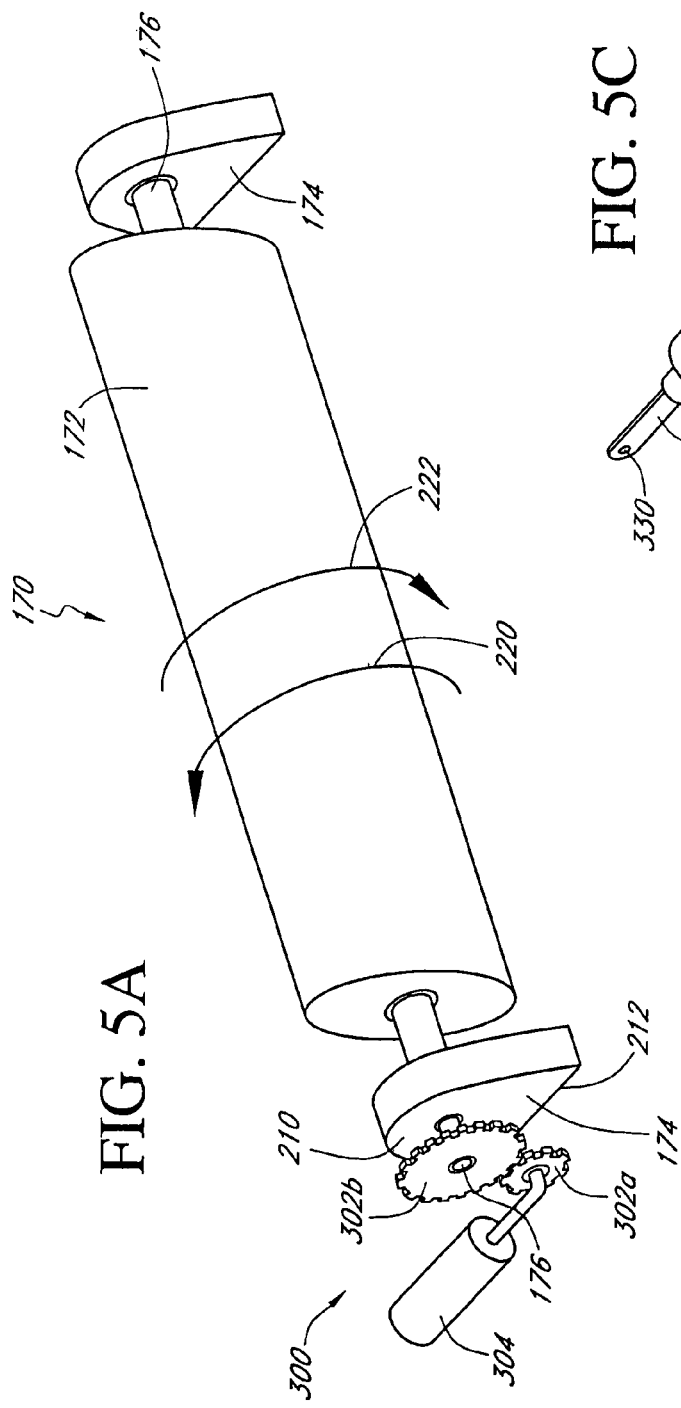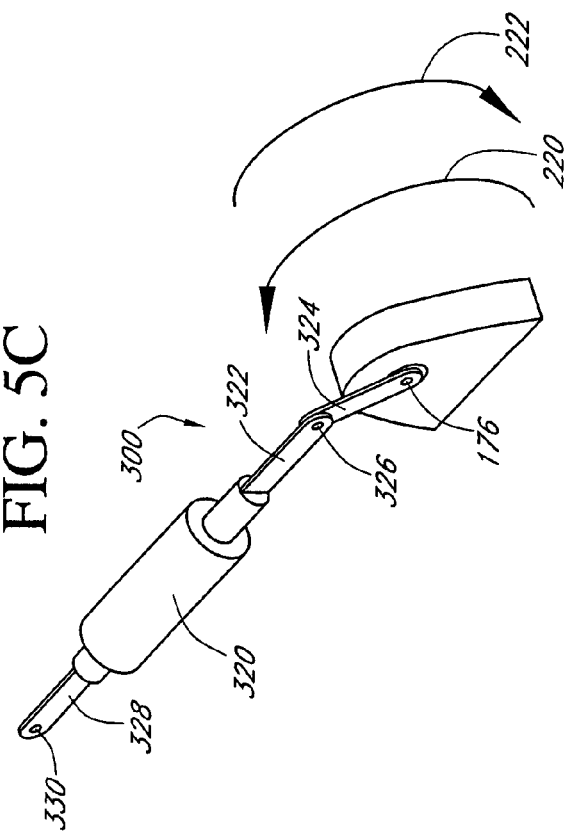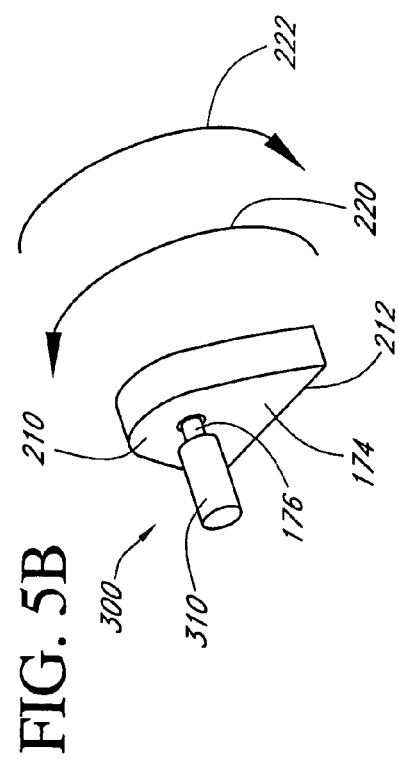

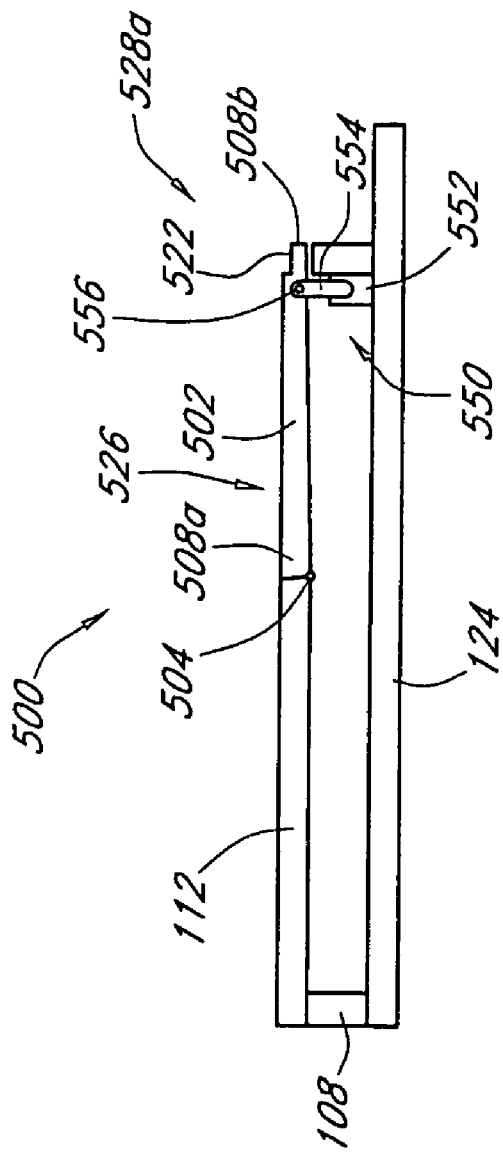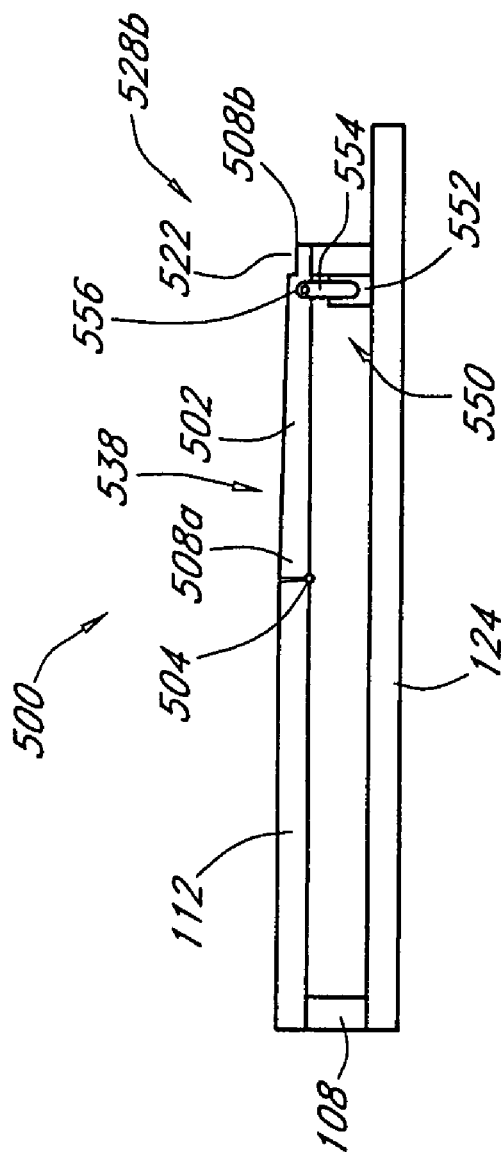

SLIDE-OUT LIFTING AND LOWERING MECHANISM

CLAIM OF PRIORITY

This application is a divisional of U.S. application Ser. No. 10/773,560 filed Feb. 5, 2004, now U.S. Pat. No. 7,066,528 entitled "SLIDE-OUT LIFTING AND LOWERING MECHANISM"; and this application claims priority to Provisional Application No. 60/446,186, filed Feb. 5, 2003, entitled "SLIDE-OUT LIFTING/LOWERING SYSTEM FOR RECREATIONAL VEHICLES", which is hereby incorporated by reference herein in its entirety.

RELATED APPLICATIONS

The parent (Ser. No. 10/773,560) of this application was filed concurrently with, and is related to Applicant's applications entitled "SLIDE-OUT LIFTING/LOWERING SYSTEM FOR RECREATIONAL VEHICLES" (Ser. No. 10/773,557, now U.S. Pat. No. 7,011,351, and "MOVEABLE FLOOR SECTION FOR LIFTING AND LOWERING SLIDE-OUTS" (Ser. No. 10/773,556), and are incorporated by reference herein in their entirety.

BACKGROUND OF THE INVENTION

1. Field of the Invention

The present invention relates to recreational vehicles and, in particular, relates to a lifting and lowering system for slide-out assemblies in recreational vehicle housings.

2. Description of the Related Art

Recreational vehicles are becoming increasingly popular with people who wish to retain the comforts and conveniences of home while spending extended periods of time away from home at remote locations. In more elaborate configurations, the recreational vehicle typically includes amenities such as a bedroom, a bathroom with a sink and a flushing toilet, a kitchen with a refrigerator, stove, and sink, and a generously sized living area with reclining chairs and an entertainment center. Furthermore, a recreational vehicle may be easily parked at a wide variety of locations so that users may enjoy the amenities of the vehicle at their favorite destination. Consequently, people who use recreational vehicles may usually be assured of a comfortable living environment at their preferred remote destination without having to rely on the availability of suitable hotels.

In response to consumer demand, manufacturers have developed increasingly larger recreational vehicles. In particular, manufacturers have developed recreational vehicles with one or more extendable structures, commonly referred to as slide-outs, that provide the user with a supplemental living space when the vehicle is parked in a suitable location. The extendable structure is adapted to extend into a deployed configuration during the time that the vehicle is parked so that the interior living space within the recreational vehicle is increased by an amount which is substantially equal to the supplemental living space of the extendable structure. The extendable structure is also adapted to retract into a retracted configuration during the time that the vehicle is in motion or towed so that the traveling dimensions of the recreational vehicle are within the maximum allowed length and width.

The typical extendable structure or slide-out is positioned within an opening of the housing of the recreational vehicle and is comprised of a plurality of walls that form the supplemental living space therein and an opening that provides access to the supplemental living space. In particular, the walls of the slide-out may comprise an upper horizontal wall that forms either a single level planar ceiling, which may substantially align with an adjacent ceiling of the vehicle, or a step configuration, wherein the ceiling of the slide-out is dimensionally lower than the ceiling of the adjacent ceiling of the vehicle. In addition, the extendable structure or slide-out may also comprise an outer vertical wall that is adapted to align with an outer wall of the motorhome or travel trailer, when the slide-out is placed in the retracted configuration. In addition, a pair of horizontal sidewalls may be utilized to join the upper and lower horizontal walls and the outer vertical wall together.

Moreover, the walls of the typical slide-out are comprised of a lower horizontal wall that forms a single level planar floor, which substantially aligns with an adjacent floor of the vehicle housing. Typically, the slide-out is typically lowered after deployment of the slide-out from the vehicle housing so that the lower horizontal floor forms a single level planar floor with the vehicle housing floor. Also, the slide-out typically lifted prior to retraction of the slide-out within the vehicle housing.

Conventional lifting and lowering systems for slide-outs use an inclined surface at the lower edge of the opening in the vehicle housing and wheel, roller, or friction pads fixed to the inclined surface mounted to the lower inside edge of the slide-out. During retraction, the wheel rolls up the incline prior to retraction of the slide-out into the vehicle housing or the floor of the room slides over the fixed fraction pads in an inward manner. During deployment, the slide-out is extended out of the vehicle housing and then the wheel engages the inclined surface to lower the slide-out into position or the floor of the room slides over the fixed fraction pads in an outward manner.

Unfortunately, the inclined lower edge of these sidewall openings can be difficult to manufacture due to the structural bends that need to be formed so as to accommodate the sloped surface. Also, the structural integrity of the incline lower edge is compromised by welded components that are inadequately supported and structurally unsound. As a result, due to deployment/retraction stresses on these deficient structures, the inclined lower edge of the sidewall openings can weaken over time. From the foregoing, there currently exists a need to improve the manner in which the slide-out is lifted and lowered during retraction and deployment.

SUMMARY OF THE INVENTION

The aforementioned needs may be satisfied by a recreational vehicle comprising, in one embodiment, a main housing defining an interior living space having a floor located at a first level wherein the main housing defines a first wall having an opening formed therein. In addition, the recreational vehicle further comprises a slide-out housing having a floor an outer wall positioned within the opening in the first wall of the main housing, wherein the slide-out housing is adapted to be movable between a retracted position wherein the floor of the slide-out housing is positioned at a second level above the first level of the floor of the main housing and the outer wall is positioned substantially adjacent the first wall of the main housing and a deployed position wherein the outer wall is extended away from the first wall of the main housing and the floor of the slide-out housing is positioned at a third level below the second level so as to be more planar with the first level. Moreover, the recreational vehicle still further comprises a piston actuated movement mechanism mounted to the recreational vehicle so as to be able to move the side out housing from the second level to the third level when the side-out housing is in the deployed position and move the floor of the slide-out housing from the third level to the second level when the slide-out housing is in the retracted position.

The aforementioned needs may also be satisfied by a recreational vehicle comprising, in one embodiment, a main housing defining an interior living space having a floor located at a first level wherein the main housing defines a first wall having an opening formed therein. In addition, the recreational vehicle further comprises an expandable room having a floor an outer wall positioned within the opening in the first wall of the main housing, wherein the expandable room is adapted to be movable between a retracted position wherein the floor of the expandable room is positioned at a second level above the first level of the floor of the main housing and the outer wall is positioned substantially adjacent the first wall of the main housing and a deployed position wherein the outer wall is extended away from the first wall of the main housing and the floor of the expandable room is positioned at a third level below the second level so as to be more planar with the first level. Moreover, the recreational vehicle still further comprises a piston actuated movement mechanism mounted to the recreational vehicle, the piston actuated movement mechanism comprising at least one piston mounted to the main housing so as to extend an arm outward away from the main housing, a pivot point secured to the main housing, and a movement member coupled to the pivot point and the at least one piston mounted to the main housing such that outward movement of the piston arm results in vertical movement of the movement member so as to exert an upward force on the expandable room to thereby move the floor of the slide-out from the third level to the second level and wherein inward movement of the piston arm results in a vertical movement of the movement member so as permit the floor of the expandable room to move from the second level to the third level.

The aforementioned needs may also be satisfied by a recreational vehicle comprising, in one embodiment, a main housing defining an interior living space having a floor located at a first level wherein the main housing defines a first wall having an opening formed therein. In addition, the recreational vehicle further comprises a slide-out housing having a floor an outer wall positioned within the opening in the first wall of the main housing, wherein the slide-out housing is adapted to be movable between a retracted position wherein the floor of the slide-out housing is positioned at a second level above the first level of the floor of the main housing and the outer wall is positioned substantially adjacent the first wall of the main housing and a deployed position wherein the outer wall is extended away from the first wall of the main housing and the floor of the slide-out housing is positioned at a third level below the second level so as to be more planar with the first level. Moreover, the recreational vehicle still further comprises a piston actuated movement mechanism mounted to the recreational, the piston actuating movement mechanism comprising at least one piston having an arm wherein the at least one piston is mounted in the main housing such that the arm can be extended in a direction that has a vertical component so as to be able to move the floor of the slide-out housing from the third level to the second level and so that retraction of the arm of the at least one piston permits the floor of the slide-out housing to be able to drop from the second level to the third level during deployment of the slide-out housing.

The aforementioned needs may also be satisfied by a recreational vehicle comprising, in one embodiment, a main housing defining an interior living space having a floor located at a first level wherein the main housing defines a first wall having an opening formed therein. In addition, the recreational vehicle further comprises an expandable room having a floor an outer wall positioned within the opening in the first wall of the main housing, wherein the expandable room is adapted to be movable between a retracted position wherein the floor of the expandable room is positioned at a second level above the first level of the floor of the main housing and the outer wall is positioned substantially adjacent the first wall of the main housing and a deployed position wherein the outer wall is extended away from the first wall of the main housing and the floor of the expandable room is positioned at a third level below the second level so as to be more planar with the first level. Moreover, the recreational vehicle still further comprises a piston actuated movement mechanism mounted to the recreational vehicle so as to be able to move the side out housing from the second level to the third level when the side-out housing is in the deployed position and move the floor of the expandable room from the third level to the second level when the expandable room is in the retracted position, and wherein the piston actuating movement mechanism comprises at least one piston with an extendable arm wherein the at least one piston is mounted to a portion of the expandable room such that the arm of the at least one piston engages a portion of the main housing so as to raise and lower the floor of the housing during movement of the expandable room.

The aforementioned needs may also be satisfied by a method of moving a slide-out assembly of a recreational vehicle. In one embodiment, the method comprises positioning a slide-out room within the main housing of a recreational vehicle such that the floor of the slide-out room is positioned at a first level above the floor of the main housing and such that an outer wall of the slide-out room is positioned proximate to the outer wall of the main housing. In addition, the method further comprises deploying the slide-out room into a deployed position wherein the outer wall of the slide-out room is positioned distally from the outer wall of the main housing to thereby increase the floor space of the recreational vehicle and lowering the floor of the slide-out room from the first level to a second level which is more proximate the level of the floor of the main housing. Moreover, the method still further comprises retracting the slide-out room such that the outer wall of the slide-out room is proximate the outer wall of the main housing and moving a piston member such that the arm of the piston member moves the floor of the slide-out from the second level to the first level when the slide-out room is retracted.

These and other objects and advantages of the present invention will become more fully apparent from the following description taken in conjunction with the accompanying drawings.

BRIEF DESCRIPTION OF THE DRAWINGS

FIG. 3A illustrates a cross-sectional view of the recreational vehicle in FIG. 2, wherein the slide-out housing is in the deployed configuration.

FIG. 5A illustrates one embodiment of an actuating mechanism incorporated into the slide-out housing that lifts or lowers the slide-out housing with respect to the main housing floor.

FIG. 5B illustrates another embodiment of the actuating mechanism that lifts or lowers the slide-out housing with respect to the main housing floor.

FIG. 5C illustrates still another embodiment of the actuating mechanism that lifts or lowers the slide-out housing with respect to the main housing floor.

FIGS. 9A-9E illustrate yet another embodiment of a process for lifting and lowering the slide-out housing using a hinged flooring mechanism.

DETAILED DESCRIPTION OF THE PREFERRED EMBODIMENT

Reference will now be made to the drawings wherein like numerals refer to like parts throughout. A distinctive lifting and lowering system for recreational vehicle slide-out housings or expandable rooms will be described in greater detail herein below with reference to the drawings.

Figure 1:
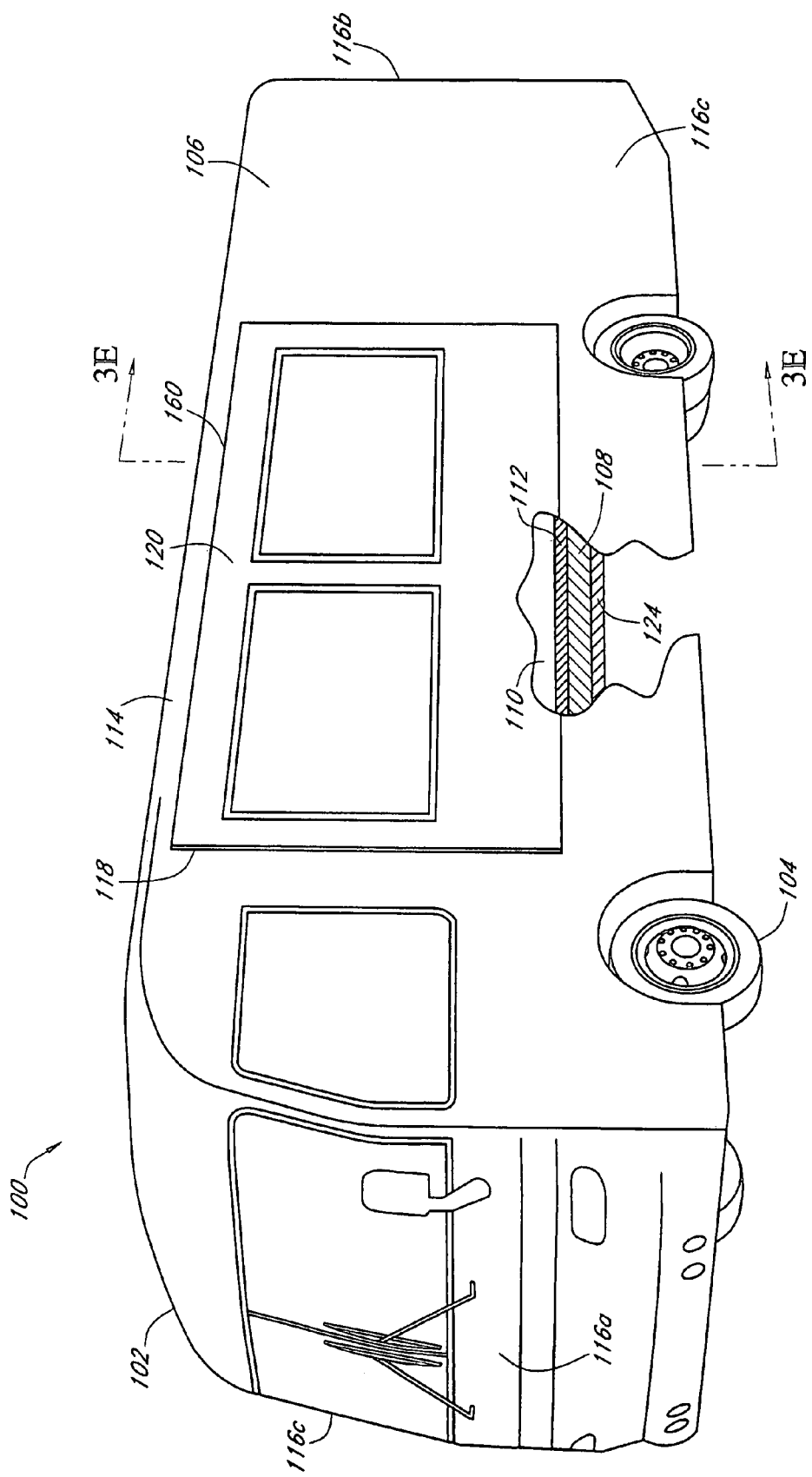
FIG. 1 illustrates one embodiment of a recreational vehicle having a generally rectangular main housing and a slide-out housing adapted to be positioned within an opening in the main housing in a retracted configuration.
Figure 2:
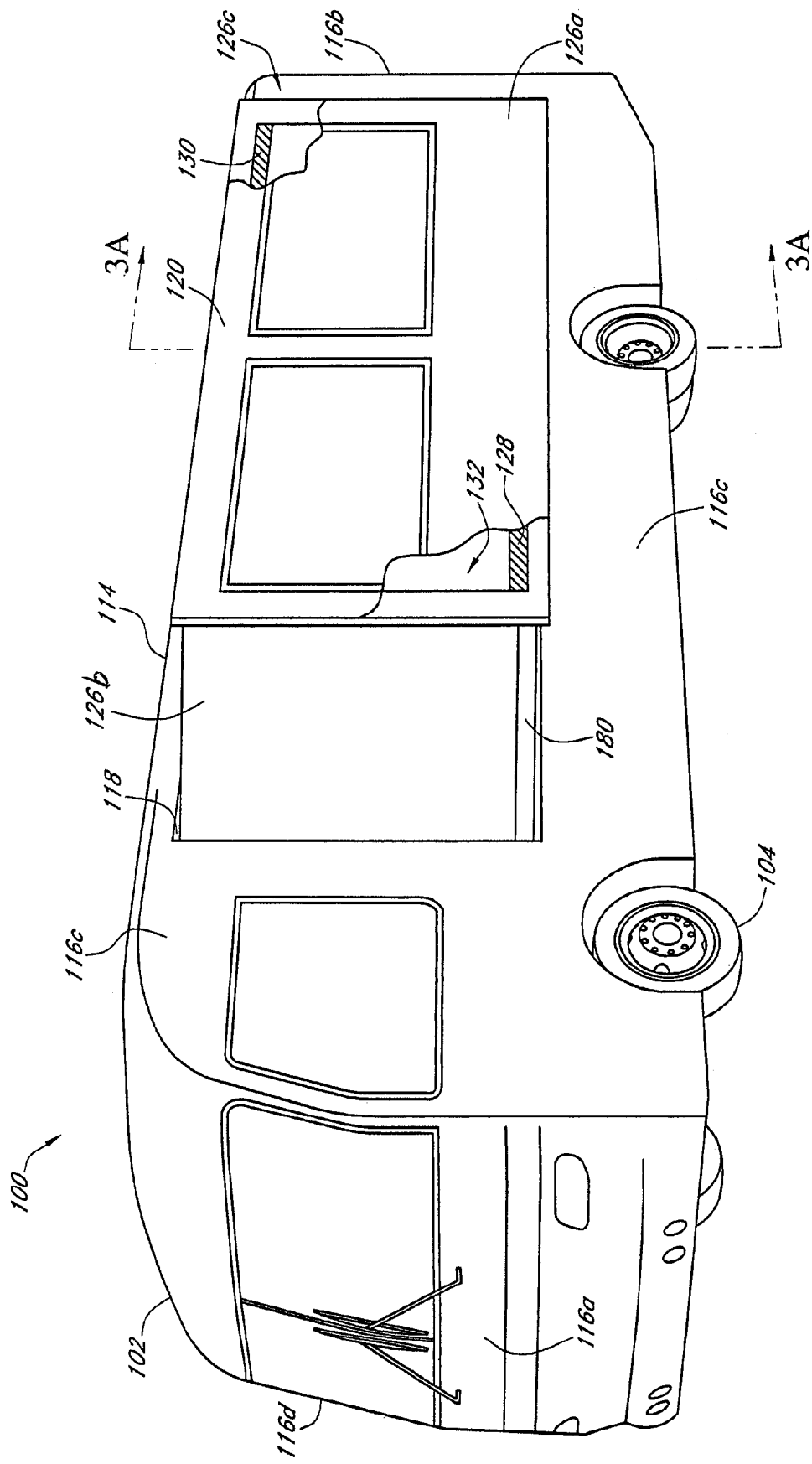
FIG. 2 illustrates one embodiment of the recreational vehicle of FIG. 1, wherein the slide-out housing is adapted to be extended from the opening in the first planar sidewall in a deployed configuration.

FIGS. 1, 2 illustrate one embodiment of a recreational vehicle (RV) 100 having a generally rectangular carriage assembly 102 attached to a plurality of wheels 104 so as to permit rolling movement of the RV 100 over the ground. In one embodiment, the carriage assembly 102 comprises a coach or main housing 106 that is essentially formed of a plurality of planar walls 116a, 116b, 116c, 116d that are joined together and mounted to a vehicle frame 108 in a generally known manner so as to define an interior living space 110 having a main housing floor 112 and roof 114. A horizontal axis, which is substantially parallel to the floor 112, extends from a front planar wall 116a of the RV 100 to a rear planar wall 116b of the RV 100. Also, the RV 100 further comprises a first fixed sidewall 116c and a second fixed sidewall 116d that is positioned opposite the first fixed sidewall 116c.

In one embodiment, the first fixed sidewall 116c comprises an opening 118 formed therein and a slide-out housing 120 positioned within the opening 118, which provides additional interior living space 132 (shown in FIG. 3A) within the RV 100. In particular, FIG. 1 illustrates the slide-out housing 120 in a retracted configuration, and FIG. 2 illustrates the slide-out housing 120 in a deployed configuration. FIG. 2 further illustrates the slide-out housing 120 comprising a plurality of exterior sidewalls including an outer sidewall 126a, and front and rear sidewalls 126b, 126c with an additional floor 128 and roof 130. The exterior sidewalls 126a, 126b, 126c are joined together to form the slide-out housing 120 that defines an additional interior living space 132. The scope and functionality of the slide-out housing 120 will be described in greater detail herein below.

As illustrated in FIG. 1, the RV 100 may comprise, for example, a motorhome. It should be appreciated that the RV 100 described herein represents any movable coach on wheels, such as, but not limited to, the illustrated motorhome, a fifth wheel trailer, a conventional trailer, a tent trailer, or even a cab-over camper for use with a pick-up truck. The RV 100, such as the motorhome illustrated in FIG. 1, permits occupants to travel and live inside the RV 100 in a comfortable manner. One aspect of comfort pertains to having sufficient living space within the RV 100 such that the interior living space 110 may be partitioned with interior planar walls and passageways in a generally known manner so as to define interior rooms and various living spaces, such as a kitchen, bedroom, bathroom, etc. and generally enhance the convenience and functionality of the RV 100.

Moreover, the carriage assembly 102 further comprises an engine, transmission, drive axle, fuel system, and electrical system of types known in the art to provide the motive power for the RV 100. The carriage assembly 102 also facilitates mounting of relatively massive items, such as generators, air conditioners, furnaces, storage and holding tanks, and the like to the vehicle frame 102, which is low to the ground, so as to provide a lower center of mass for the RV 100. In addition, the vehicle frame 108 may further comprise sub-floor components 124, such as cross-supports and other various supporting members to provide strength and structural reinforcement to the main housing floor 112, the planar sidewalls 116a, 116b, 116c, 116d, etc. These and other items related to the construction of the RV 100 are more fully disclosed in the Applicant's co-pending patent application entitled "Method of Fabricating a Motorhome" application Ser. No. 09/965,463, which is hereby incorporated by reference in its entirely.

FIGS. 3A-3E illustrate a cross sectional view of the RV 100 including the main housing 106 and the slide-out housing 120. As previously described, the slide-out housing 120 comprises exterior sidewalls including an outer sidewall 126a, and front and rear sidewalls 126b, 126c with the additional floor 128 and roof 130. In addition, the exterior sidewalls 126a, 126b, 126c are joined together to form the slide-out housing 120 that defines the additional interior living space 132. In one embodiment, the additional roof 130 comprises first and second ends 140a, 140b including a first lip section 150 attached to the first end 140a in a substantially perpendicular manner. The first lip section 150 abuts the first planar sidewall 116c of the main housing so that, when the slide-out housing 120 is deployed, the first lip section 150 limits the outward travel of the slide-out housing 120 from the opening 118.

As illustrated in FIGS. 3A-3E, the additional floor 128 of the slide-out housing 120 is substantially parallel to the main housing floor of the RV 100. The additional floor 128 comprises first and second ends 138a, 138b including a second lip section 152 attached to the first end 139A that couples with a complementary lip section 154 of the main housing floor 112. When the slide-out housing 120 is deployed, the second lip section 152 couples to the complementary lip section 154 so that the additional floor 128 of the slide-out housing 120 is substantially aligned in substantially the same plane with the main housing floor 112. When aligned, the coupling of the floors 112, 128 forms a substantially uniform planar flooring surface 156 between the main housing 106 and the slide-out housing 120.

In addition, the outer sidewall 126a comprises an upper section 142a that attaches to the second end 140b of the additional roof 130 and a lower section 142b that attaches to the second end 138a of the additional floor 128 in a substantially perpendicular manner. It should be appreciated that the second end 140b of the additional roof 130 may be attached to the upper section 142a of the outer sidewall 126a at an angular offset such that the first end 140a of the additional roof 130 may be at a height that is at least larger than the height of the second end 140b of the additional roof 130 with respect to the additional floor 128 of the slide-out housing 120. The outer sidewall 126a further comprises flanged edges 160 positioned adjacent to the outer perimeter of the outer sidewall 126a that abuts the first planar sidewall 116c of the main housing 106 when the slide-out housing 120 is retracted. In one embodiment, the flanged edges 160 of the outer sidewall 126a function as sealing components to prevent the external environment from affecting the climate within the interior living spaces 110, 132.

The main housing 106 further comprises a cam assembly 170 having one or more cam members 172 attached to the vehicle frame 108 or a sub-floor component 124 of the main housing floor 112 via one or more mounting brackets 174 and one or more first fastening pins 176, respectively. In one embodiment, the cam member 172 comprises an oval contoured structure having an elongate dimension with partially tipped surfaces 178a and a narrow dimension with partially flattened surfaces 178b including a curved surface 178c defined there between. The difference between the length of the elongate dimension and the length of the narrow dimension is, in this embodiment, at least the thickness of the main housing floor 112 so that, during rotation of the cam member 172, the additional floor 128 of the slide-out housing 120 can be lifted above the main housing floor 112. In addition, the cam assembly 170 also comprises an actuating mechanism (shown in FIGS. 5A, 5B) that induces rotation of the cam member 172 about a horizontal axis defined by the first fastening pin 176 when the slide-out housing 120 is lifted and lowered during retraction and deployment. As will be described in greater detail herein below, the actuating mechanism may comprise various types of electrical, mechanical, pneumatic, or hydraulic devices without departing from the scope of the present invention. Also, the cam member 172 may comprise a rigid metal composition that can withstand heavy weight stresses without deforming. It should be appreciated that the cam member 172 may comprise various other material compositions without departing from the scope of the present invention.

In one embodiment, the mounting bracket 174 may comprise a half-oval contoured structure with a rounded upper section 210 and a flat lower section 212. The mounting bracket 174 may further comprise an opening formed adjacent the rounded upper section 210 so as to define an aperture 214 that can receive at least a portion of the first fastening pin 176 and couple therewith. The mounting bracket 174 couples with the first fastening pin 176 in a manner so as to permit rotation of the first fastening pin 176 within the aperture 214. A lubrication product, such as a petroleum based grease, may be used to reduce friction between the first fastening pin 176 and the aperture 214. The mounting bracket 174 may be attached to the vehicle frame 108 and/or the sub-floor component 124 using generally known welding technology, mounting bolts, or various other known mounting technologies. In addition, the mounting bracket 174 including the first fastening pin 176 may comprise a rigid metal composition that can withstand heavy weight stresses without deforming.

The main housing 106 still further comprises a telescoping member 180 having a device housing 182 that is attached to the vehicle frame 108 and an armature 184 that distally extends from the device housing 182 at a first end 188a of the armature 184 so as to deploy the slide-out housing 120 from the main housing 106 via the opening 118 in the first planar sidewall 116c. The armature 184 also extends towards the first end 188a within the device housing 182 so as to retract the slide-out housing 120 into the main housing 106 via the opening 118 in the first planar sidewall 116c. It should be appreciated that the device housing 182 may also be attached to the main housing floor 112 or to the sub-floor component 124 of the main housing floor 112 in a generally known manner without departing from the scope of the present invention.

Additionally, the armature 184 further comprises a second end 188b that is attached to the second end 138b of the additional flooring 128 via a second fastening pin 190 and a slotted member 192. The slotted member 192 comprises an opening that defines an enclosed slotted section 194. In one embodiment, the second end 188b of the armature 184 couples to the slotted section 194 of the slotted member 192 via the second fastening pin 190 so that the slide-out housing 120 including the additional floor 128 can freely move in a vertical direction 198 without altering the positional orientation of the telescoping member 180 including the armature 184 and the device housing 182. In addition, as will be described in greater detail herein below, the slide-out housing 120 can be lifted and lowered during retraction and deployment by the cam assembly 170, wherein the armature 184 maintains, in one embodiment, a substantially parallel position with respect to the additional floor 128 of the slide-out housing 120.

During deployment, the telescoping member 180 applies a pushing force to the armature 184 in a generally known manner so as to deploy or push the slide-out housing 120 from the main housing 106 by extending the armature 184 in a pushing direction 200 away from the opening 118 in the first planar sidewall 116c. The applied pushing force of the telescoping member 180 is transferred from the armature 184 to the second fastening pin 190 and then to the slotted member 192. Since the slotted member 192 is attached to the additional floor 128 of the slide-out housing 120, the applied pushing force thereby pushes the slide-out housing 120 out of the opening 118 in the first planar sidewall 116c via the coupling of the second fastening pin 190 and the slotted member 192.

Similarly, during retraction, the telescoping member 180 applies a pulling force to the armature 184 in a generally known manner so as to retract or pull the slide-out housing 120 towards the main housing 106 by extending the armature 184 in a pulling direction 202 towards the opening 118 in the first planar sidewall 116c. The applied pulling force of the telescoping member 180 is transferred from the armature 184 to the second fastening pin 190 and then to the slotted member 192. Since the slotted member 192 is attached to the additional floor 128 of the slide-out housing 120, the applied pulling force thereby pulls the slide-out housing 120 towards the opening 118 in the first planar sidewall 116c via the coupling of the second fastening pin 190 and the slotted member 192.

FIGS. 3A-3E further illustrate a process for lifting the slide-out housing 120 during retraction using the cam assembly 170. However, it should be appreciated that the illustrated process may also be ordered in reverse from FIG. 3E to FIG. 3A for lowering the slide-out housing 120 during deployment using the cam assembly 170.

FIG. 3A illustrates the slide-out housing 120 in the deployed configuration as also illustrated in FIG. 2. The slide-out housing 120 is positioned in a lowered orientation such that the additional floor 128 of the slide-out housing 120 is substantially aligned with the main housing floor 112 of the RV 100 and the cam member 172 of the cam assembly 170 is positioned substantially parallel to the floors 112, 128 of the RV 100 and the slide-out housing 120. As illustrated in FIG. 3A, the additional floor 128 of the slide-out housing 120 physically contacts and rests on the partially flattened surface 179B of the cam member 172. Also, the first lip section 150 of the additional roof 130 abuts the first planar sidewall 116c of the main housing 106 so as to form a first contact seal 204 therebetween.

Additionally, when the slide-out housing 120 is in the lowered orientation, the second lip section 152 of the additional floor 128 is coupled to the complementary lip section 154 of the main housing floor 112. In one embodiment, the second lip section 152 outwardly extends in a substantially parallel manner from the additional floor 128. The second lip section 152 may comprise a thickness that is at least less than the thickness of the additional floor 128. Also, the complementary lip section 154 outwardly extends in a substantially parallel manner from the main housing floor 112. The complementary lip section 154 may comprise a thickness that is at least less than the thickness of the main housing floor 112. As further illustrated in FIG. 3A, when the slide-out housing 120 is in the lowered orientation, the second lip section 152 is positioned adjacent to the complementary lip section 154 such that, when coupled, the floors 112, 128 form a substantially uniform planar flooring surface 156 between the main housing 106 and the slide-out housing 120.

Figure 3B:
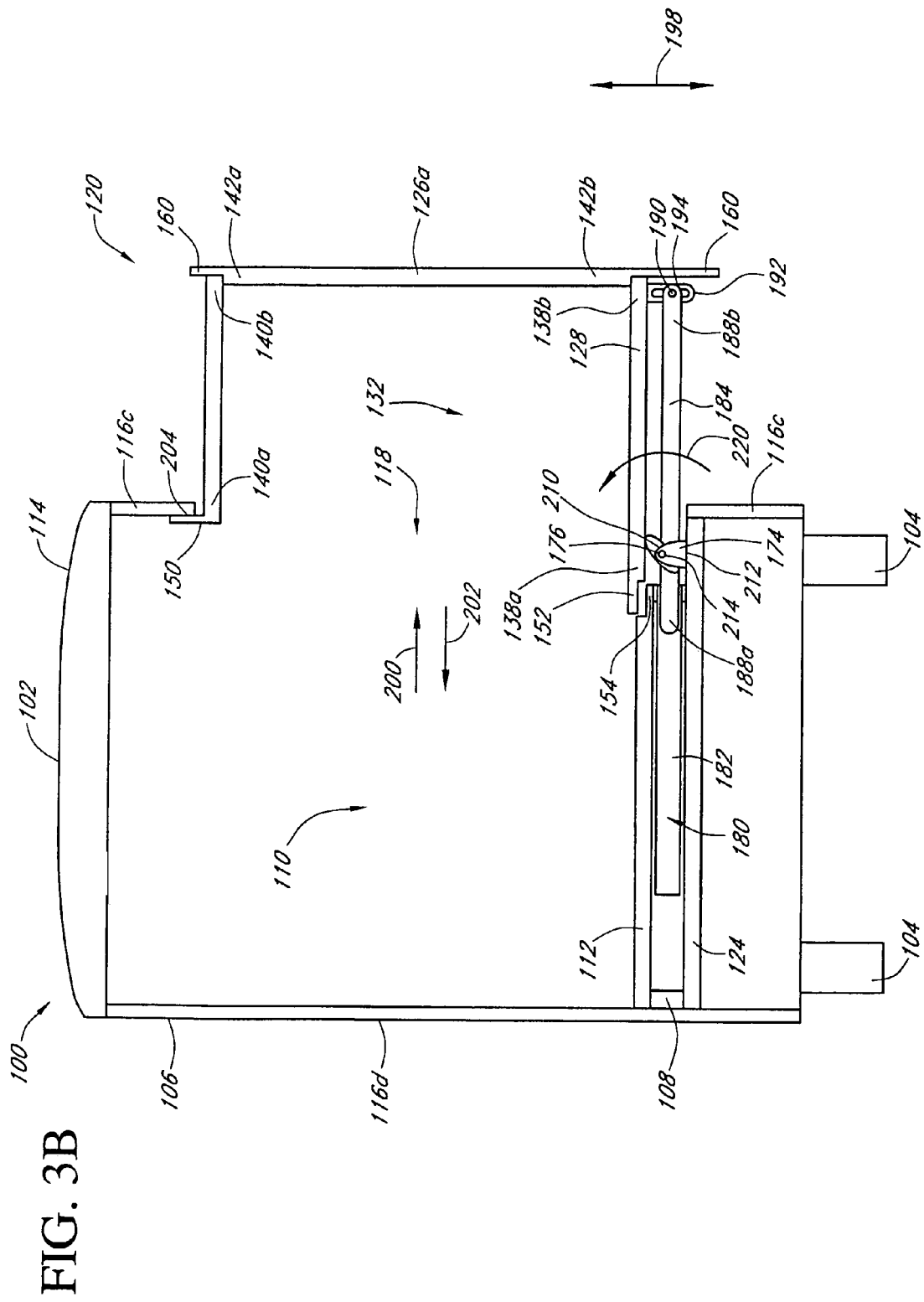
FIG. 3B illustrates the recreational vehicle in FIG. 3A, wherein the slide-out housing is in a partially lifted or partially lowered orientation.

FIG. 3B illustrates the slide-out housing 120 being partially lifted by the cam member 172 of the cam assembly 170, wherein the cam member 172 is partially turned in a first direction 220. In one embodiment, as the cam member 172 rotates in the first direction 220, the cam member 172 maintains physical contact with the additional floor 128 of the slide-out housing 120 via the curved surface 179C of the cam member 172, which causes the slide-out housing 120 to be upwardly shifted or lifted so that the additional floor 128 begins to rise at a positional offset above the main housing floor 112. During rotation of the cam member 172 in the first direction 220, the curved surface 179C of the cam member 172 maintains physical contact with the additional floor 128 of the slide-out housing 120.

Figure 3C:
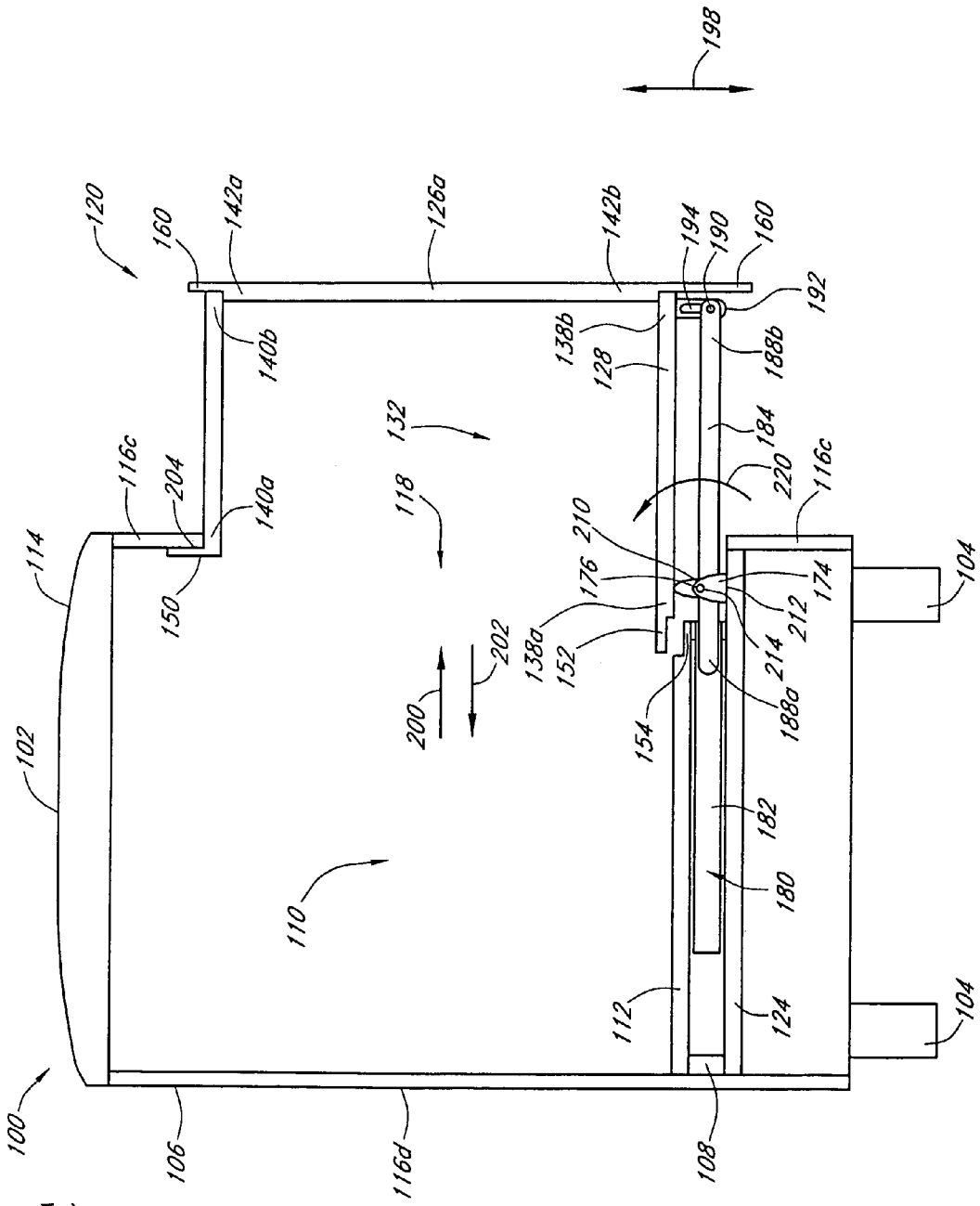
FIG. 3C illustrates the recreational vehicle in FIG. 3A, wherein the slide-out housing is in a lifted orientation.

FIG. 3C illustrates the position of the slide-out housing 120 in a lifted orientation such that the cam member 172 is turned approximately 90° or a quarter-turn in the first direction 220 until the cam member 172 is positioned substantially perpendicular to the floors 112, 128 of the RV 100 and the slide-out housing 120. Once the slide-out housing 120 is positioned in the lifted orientation, the additional floor 128 of the slide-out housing 120 physically contacts and rests on the partially tipped surface 179A of the cam member 172. As illustrated, once the slide-out housing 120 is lifted by the cam member 172 of the cam assembly 170, the additional floor 128 of the slide-out housing 120 is distally offset from the main housing floor 112 of the RV 100 by an amount at least as much as the thickness of the main housing floor 112. Advantageously, offsetting the floors 112, 128 allows the slide-out housing 120 to readily retract within the opening 118 of the main housing 106.

Figure 3D:
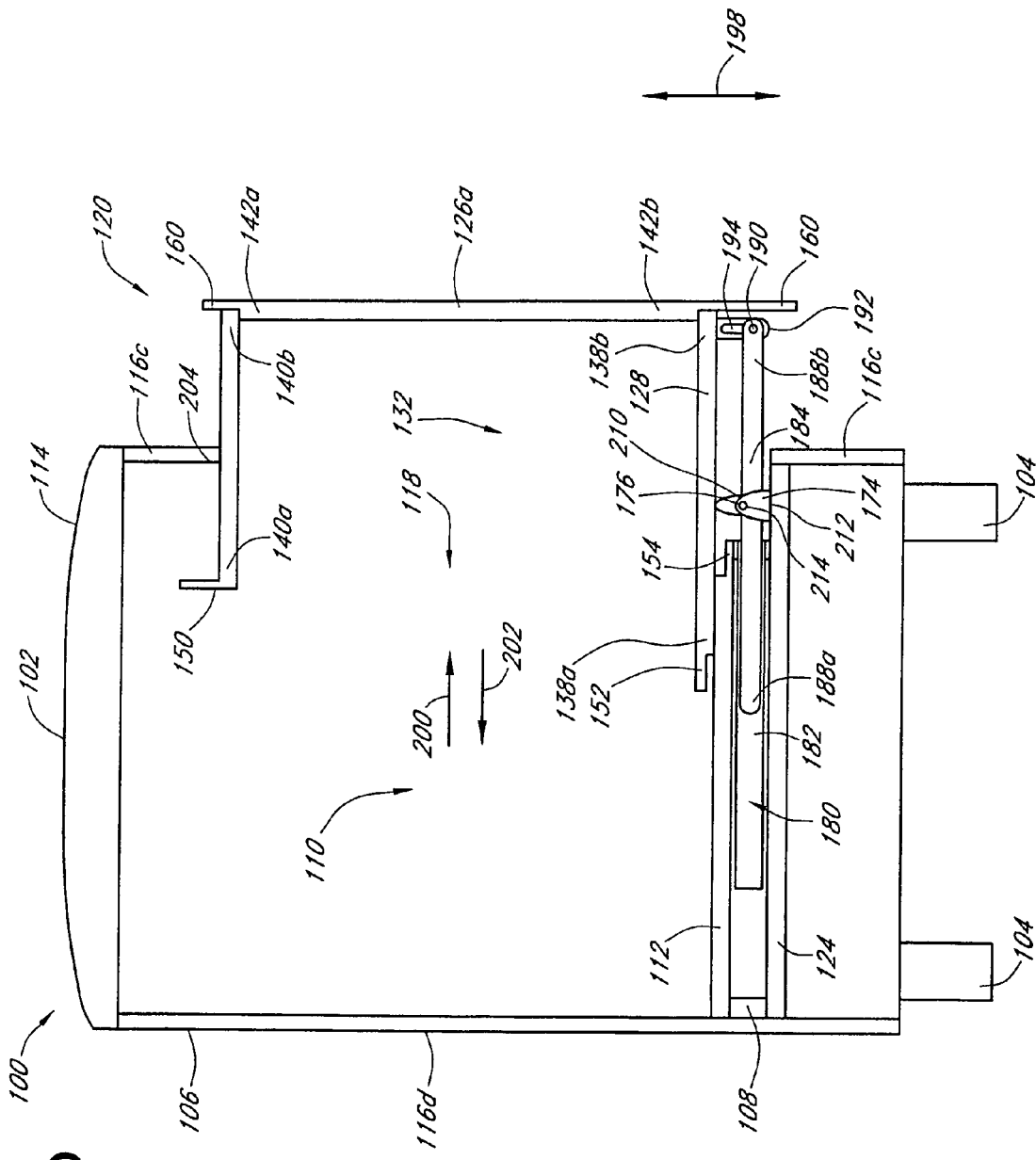
FIG. 3D illustrates a cross-sectional view of the recreational vehicle in FIGS. 1, 2, wherein the slide-out housing is in a partially retracted or partially deployed configuration.

FIG. 3D illustrates the slide-out housing 120 in a partially retracted position. During retraction, the additional floor 128 of the slide-out housing 120 slides along the partially tipped surface 179A of the cam member 172 while the telescoping member 180 retracts the slide-out housing 120, in a manner as previously described, within the opening 118 formed in the first planar sidewall 116c of the main housing 106. In one embodiment, the additional floor 128 of the slide-out housing 120 also slides along and is supported by the main housing floor 112 during retraction. As illustrated, the cam member 172 of the cam assembly 170 maintains a substantially perpendicular positional orientation during retraction of the slide-out housing within the main housing 106.

Figure 3E:
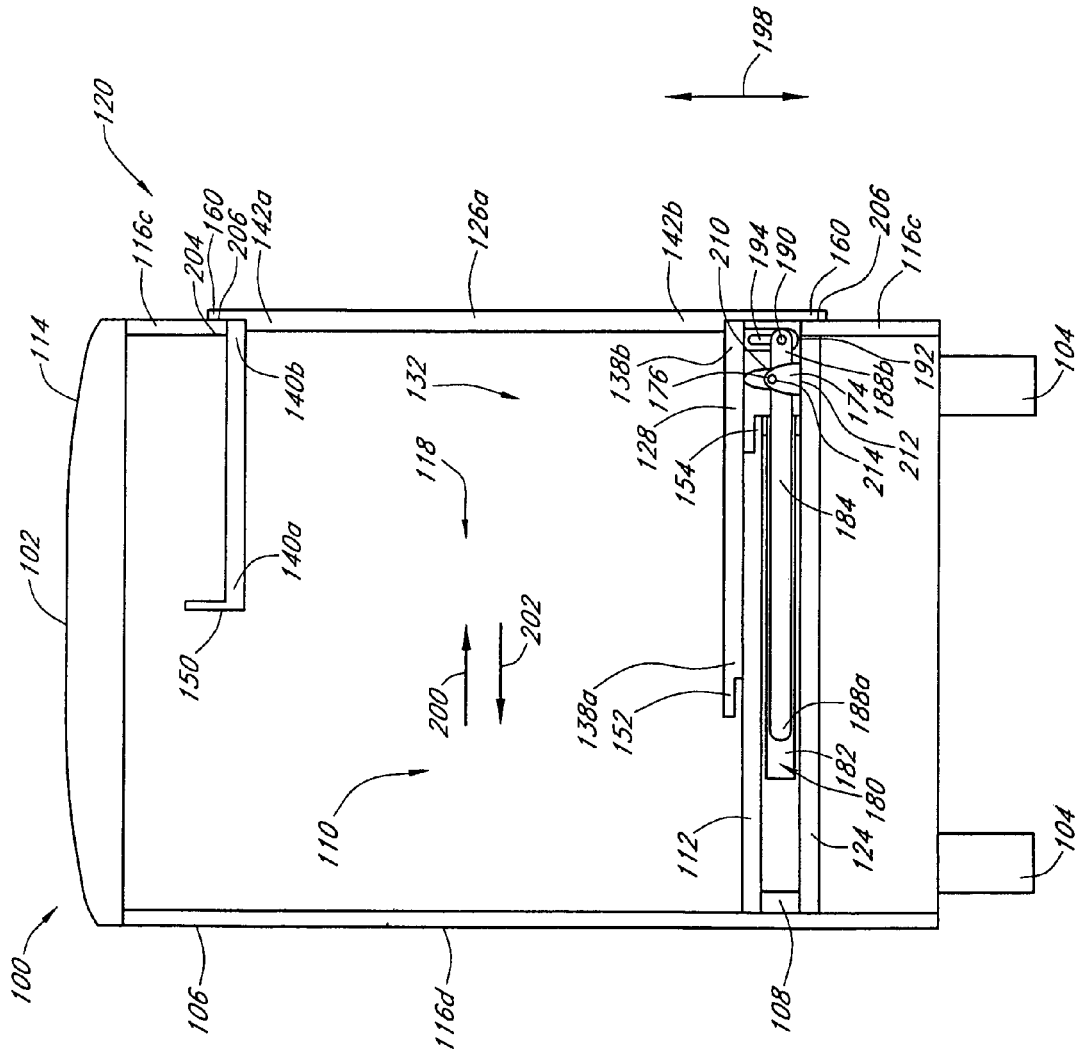
FIG. 3E illustrates a cross-sectional view of the recreational vehicle in FIG. 1, wherein the slide-out housing in the retracted configuration.

FIG. 3E illustrates the slide-out housing 120 in the retracted configuration as also illustrated in FIG. 1. When retracted, the slide-out housing 120 maintains the lifted orientation such that the additional floor 128 of the slide-out housing is positioned above and substantially parallel to the main housing floor 112 of the RV 100. In addition, as illustrated in FIG. 3E, the cam assembly 170 also maintains a position that is substantially parallel to the floors 112, 128 of the RV 100 and the slide-out housing 120. Once retracted, the flanged edges 160 of the outer sidewall 126a of the slide-out housing 120 abut the first planar sidewall 116c of the main housing 106 so as to form a second contact seal 206 therebetween.

Advantageously, the slide-out housing 120 can be lifted from the lowered orientation as illustrated in FIG. 3A to the lifted orientation as illustrated in FIG. 3C with approximately a quarter-turn of the cam member 172 in the first direction 220. Similarly, the slide-out housing 120 can be lowered from the lifted orientation as illustrated in FIG. 3C to the lowered orientation as illustrated in FIG. 3A with approximately a quarter-turn of the cam member 172 in the second direction 222. The ease and manner in which the cam member 172 of the cam assembly 170 can be rotated in the first or second direction 220, 222 will be described in greater detail herein below with reference to FIGS. 5A-5C.

Figure 4A:
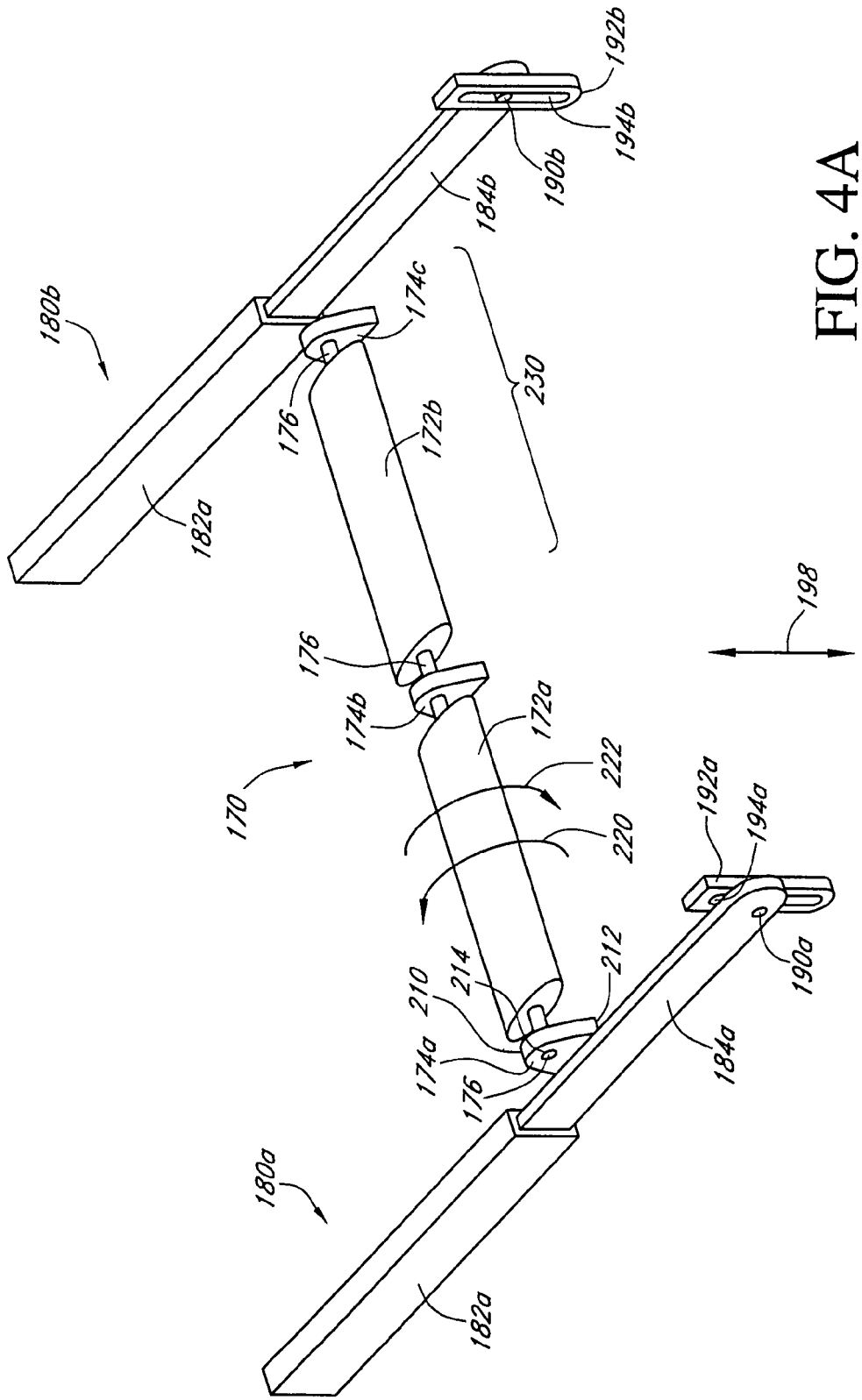
FIG. 4A illustrates the cam assembly and the telescoping member in the deployed configuration as described in FIGS. 2, 3A.
Figure 4B:
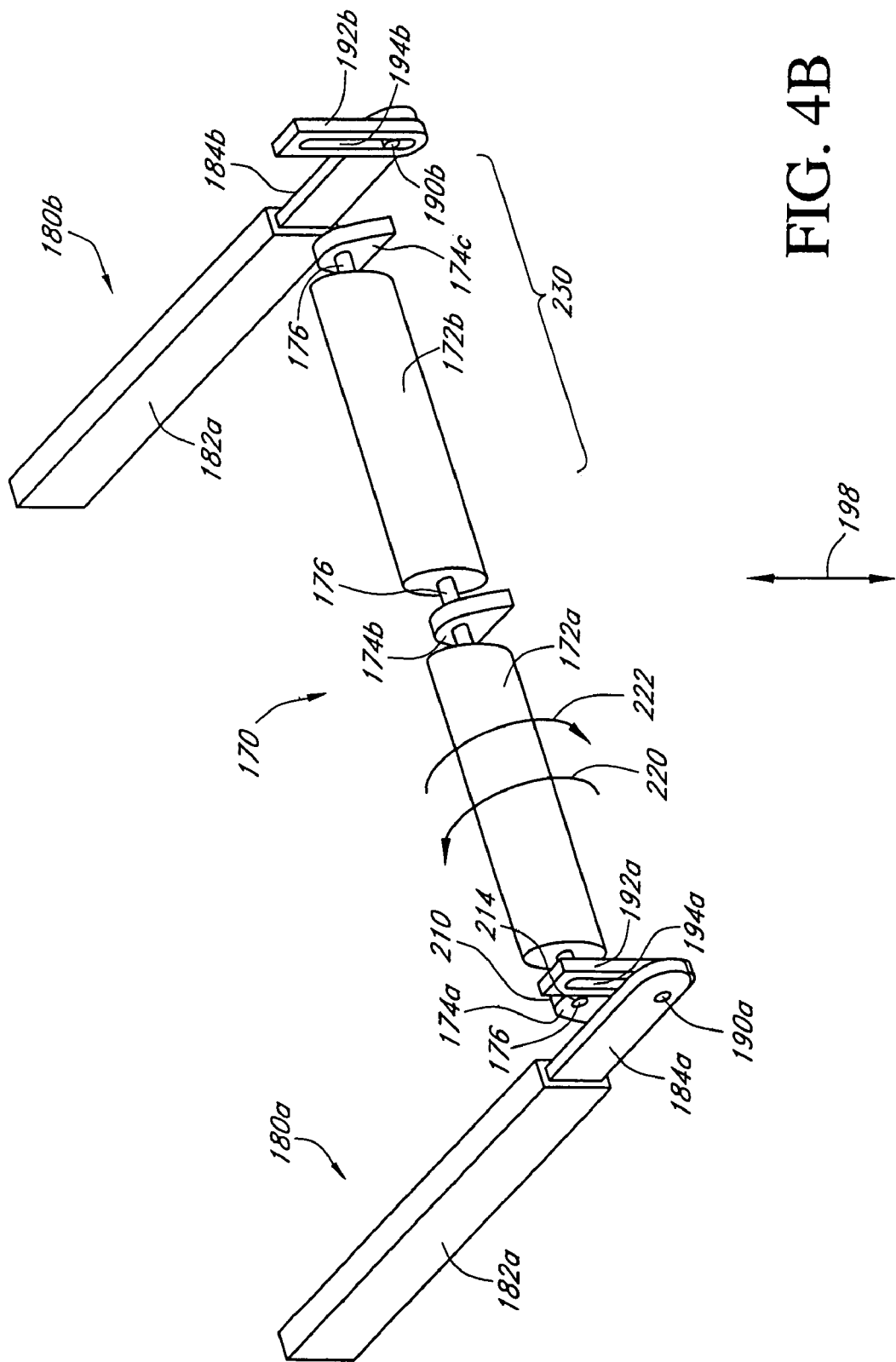
FIG. 4B illustrates the cam assembly and the telescoping member in the retracted configuration as described in FIGS. 1, 3E.

FIG. 4A illustrates the cam assembly 170 and the telescoping member 180 in the deployed configuration as described in FIGS. 2, 3A. FIG. 4B illustrates the cam assembly 170 and the telescoping member 180 in the retracted configuration as described in FIGS. 1, 3E. In one embodiment, the cam assembly 180 may comprise one or more cam members 172, mounting brackets 174, and first fastening pins 176 positioned adjacent to or between one or more telescoping members 180. In addition, the one or more cam members 172 of the cam assembly 170 may comprise a first length 230 that is at least less than the width of the slide-out housing 120 and/or the width of the opening 118 formed in the first planar sidewall 116c of the main housing 106.

For purposes of discussion, FIGS. 4A, 4B illustrate the cam assembly 170 positioned between first and second telescoping members 180a, 180b. Also, as illustrated, the cam assembly 170 having a plurality of mounting brackets 174 attached to a plurality of cam members 172 via the first fastening pin 176 and the apertures 214 formed in the mounting brackets 174. In particular, a first cam member 172a is positioned between first and second mounting brackets 174a, 174b and a second cam member 172b is positioned between second and third mounting brackets 174b, 174c. In one aspect, the first fastening pin 176 is attached to the cam members 172a, 172b and the mounting brackets 174a, 174b, 174c so as to pass therethrough and form the cam assembly 170. Alternatively, a plurality of first fastening pins 176 may be used to interconnect the cam members 172a, 172b and the mounting brackets 174a, 174b, 174c so as to form the cam assembly 170 without departing from the scope of the present invention. It should be appreciated that the one or more first fastening pins 176 may be attached to the cam members 174 using welding technology or various other mounting technologies that are generally known in the art.

In one embodiment, the one or more cam members 172 rotate in unison about a horizontal axis that is defined by the first fastening pin 176 in either the first direction 220 so as to lift the slide-out housing 120 or in a second direction 220 that is opposite the first direction 220 so as to lower the slide-out assembly 120. The manner in which the one or more cam members 172 can be rotated will be described in greater detail herein below with reference to FIG. 5. In a manner as previously described, the armatures 184a, 184b of the telescoping members 180a, 180b are attached to the slotted sections 194a, 194b of the slotted members 192a, 192b via the second fastening pins 190a, 190b. Also, the armatures 184a, 184b extend within and out of the device housings 182a, 182b of the telescoping members 180a, 180b during retraction and deployment of the slide-out housing 120, respectively. Moreover, during lifting and lowering of the slide-out housing 120, the telescoping members 180a, 180b remain stationary while the slotted member 192 freely moves in upward and downward vertical directions 198, respectively. Therefore, rotating the one or more cam members 172 in the first or second direction 220, 222 readily permits lifting or lowering the slide-out housing 120 in the vertical directions 198. It should be appreciated that the cam assembly 170 may comprise one or more additional cam members positioned between or adjacent to the illustrated cam members 172 for increased structural support of the slide-out housing 120 without departing from the scope of the present invention.

FIG. 5A illustrates one embodiment of an actuating mechanism 300 comprising one or more actuating devices, such as gearing components 302 and an electric motor 304, that can be adapted to rotate the one or more cam members 172 of the cam assembly 170 in the first or second direction 220, 222 so as to lift or lower the slide-out housing 120 with respect to the main housing floor 112. As illustrated in FIG. 5A, one or more gearing components 302 may be rigidly attached to the first fastening pin 176 using various mounting technologies, such as welding technology or nut/bolt technology. In one embodiment, the gearing components 302 may comprise one or more mechanical actuating devices, such as a first and second gearing component 302a, 302b, wherein a gear reduction ratio may be applied to the gearing components 302 such that the first gearing component 302a is at least smaller than the second gearing component 302b. It should be appreciated that various mechanical actuating devices, such as solenoid, pneumatic, and/or hydraulic actuating and/or rotating devices may be used without departing from the scope of the present invention.

Additionally, the actuating device or electric motor 304 can be attached to the first gearing component 302a and the second gearing component 302b can be attached to the first fastening pin 176 so that the gearing components couple and engage each other. In one aspect, when the actuating device or electric motor 304 is active, the rotational movement of the electric motor 302 transfers to the first fastening pin 176 via the first and second gearing components 302a, 302b such that a mechanical advantage, in the form of increased torque, is gained by the second gearing component 302b in a generally known manner. Moreover, the actuating device or electric motor 304 can remain active until approximately a quarter-turn rotation is developed by the cam member 172 in either the first or second direction 220, 222 so as to lift or lower the slide-out housing 120.

FIG. 5B illustrates another embodiment of the actuating mechanism 300 comprising a rotating solenoid 310 that can also be adapted to rotate the one or more cam members 172 of the cam assembly 170 in the first or second direction 220, 222 so as to lift or lower the slide-out housing 120 with respect to the main housing floor 112. In this particular embodiment, the rotating solenoid 310 can electrically activated to rotate in either a clockwise or counter-clockwise direction to thereby induce the cam member 172 to rotate in the first or second direction 220, 222 so as to lift or lower the slide-out housing 120. The rotating solenoid 310 can be rigidly attached to the first fastening pin 176 using generally known mounting techniques so that, when the rotating solenoid 310 is electrically activated, the rotational movement of the rotating solenoid 310 is transferred to the first fastening pin 176 via the rigid attachment.

FIG. 5C illustrates still another embodiment of the actuating mechanism 300 comprising either a push-pull solenoid, pneumatic, or hydraulic mechanism 300 that can also be adapted to rotate the one or more cam members 172 of the cam assembly 170 in the first or second direction 220, 222 so as to lift or lower the slide-out housing 120 with respect to the main housing floor 112. In one embodiment, the solenoid, pneumatic, or hydraulic mechanism 320 comprises an actuator or piston 322 that is rotatably attached to a first auxiliary armature 324 via a first bolt member 326. In addition, the auxiliary armature 324 is rotatably attached to the first fastening pin 176. Furthermore, the solenoid, pneumatic, or hydraulic mechanism 320 may further comprise a mounting armature 328 that can be rotatably attached to the vehicle frame 108 or the sub-floor component 124 of the main housing 106 via a second bolt member 330.

In one embodiment, the actuator or piston 322 functions as a plunging device that horizontally moves into and out of the solenoid, pneumatic, or hydraulic mechanism 320 so as to provide a plunging force to the first auxiliary armature in a generally known manner. When the piston 322 plunges into and out of the solenoid, pneumatic, or hydraulic mechanism 320, the plunging force is transferred to the first fastening pin 176 via the first auxiliary armature 324 to thereby rotate the cam member 172 in the first direction 222 so as to lift the slide-out housing 120. Similarly, when the piston 322 plunges out of the solenoid, pneumatic, or hydraulic mechanism 320, the plunging force is transferred to the first fastening pin 176 via the first auxiliary armature 324 to thereby rotate the cam member 172 in the second direction 222 so as to lower the slide-out housing 120. In one aspect, when the solenoid, pneumatic, or hydraulic mechanism 320 is vertically displaced by rotational movement of the first auxiliary armature 324, the coupling of the mounting armature 328 to the second bolt member 330 allows the solenoid, pneumatic, or hydraulic mechanism 320 to partially rotate with respect to the vehicle frame 108.

It should be appreciated that the cam assembly 170 may comprise one or more actuating mechanisms 300 positioned between or adjacent to the illustrated cam members 172 without departing from the scope of the present invention. In one embodiment, additional actuating mechanisms 300 may be utilized to increase the lifting strength of the cam assembly 170.

Figure 6A:
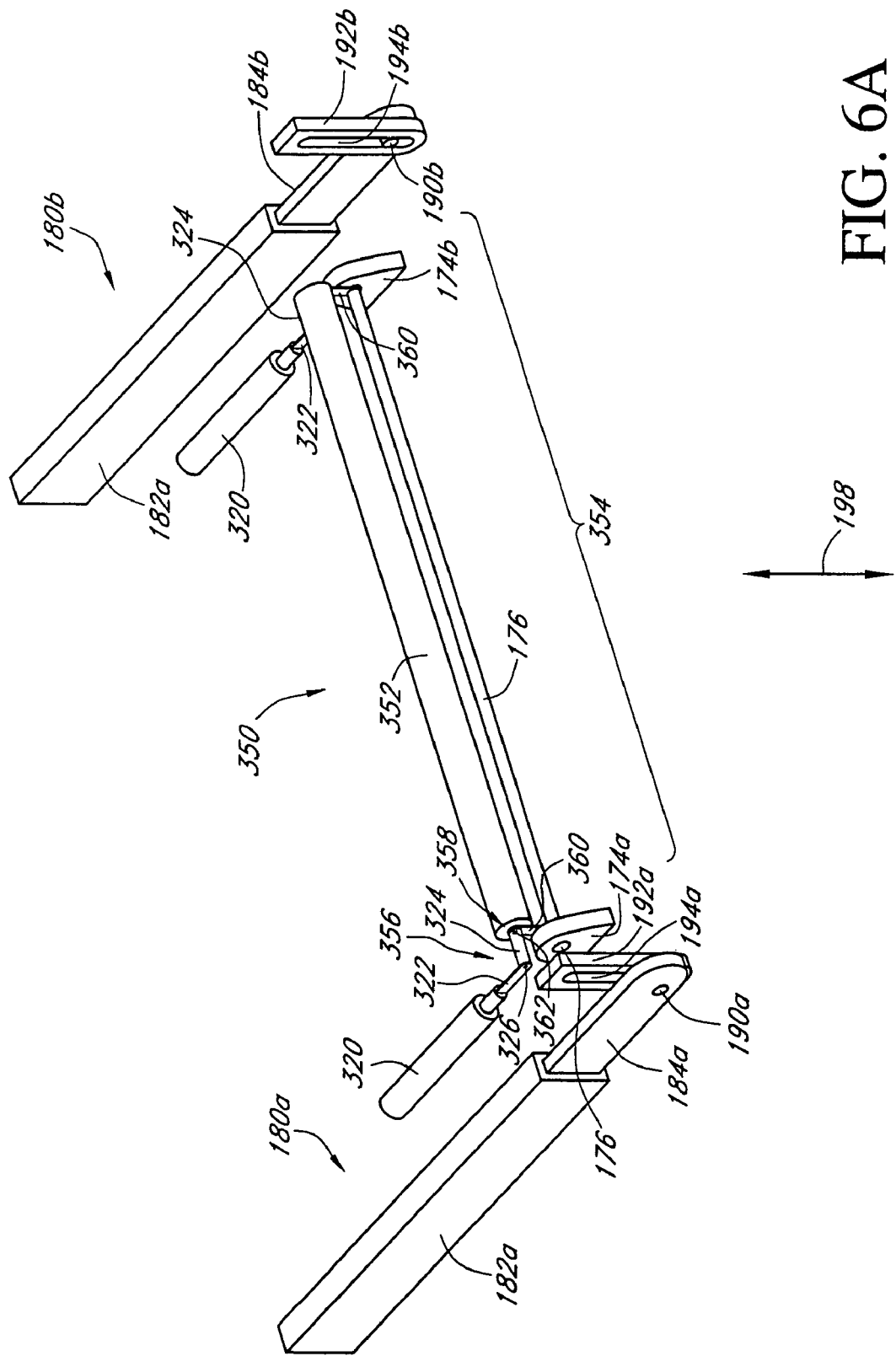
FIGS. 6A, 6B illustrate a process for lifting and lowering the slide-out housing during retraction and deployment using a linkage assembly.
Figure 6B:
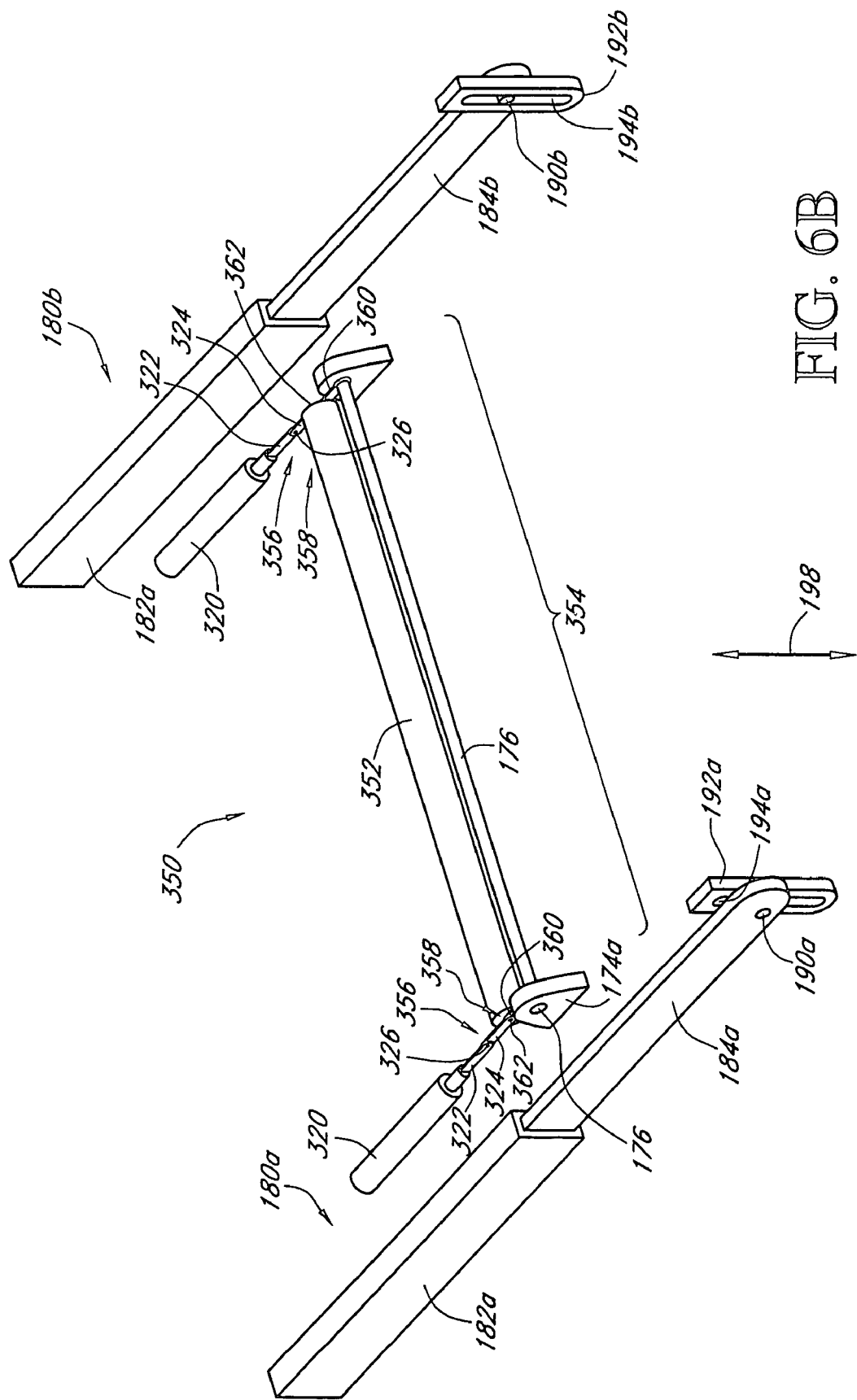

FIGS. 6A, 6B illustrate another embodiment of a process for lifting and lowering the slide-out housing 120 during retraction and deployment using a linkage assembly 350. As illustrated, the linkage assembly 350 may comprise one or more solenoid, pneumatic, or hydraulic mechanisms 320 each having at least one piston 322 that operates in a similar manner as previously described above with reference to FIG. 5C. Each solenoid, pneumatic, or hydraulic mechanism 320 further comprises first auxiliary armatures 324 and second auxiliary armatures 360. In one embodiment, each piston 322 and first and second auxiliary armatures 324, 360 are rotatably linked together from end to end so as to form a collapsible rod-like structure. As illustrated in FIGS. 6A, 6B, each piston 322 is rotatably attached to first auxiliary armatures 322 from end to end via first bolt members 326 so as to define first armature joints 356.

Also, each of the first auxiliary members 322 are rotatably attached from end to end to second auxiliary members 324 via second bolt members 362 so as to define second armature joints 358. Moreover, each of the second auxiliary members 360 are attached end to end to the first fastening pin 176 so that, when the second auxiliary armatures 360 rotate, the first fastening pin also rotates. As previously described, the first fastening pin 176 is rotatably attached to the mounting brackets 174a, 174b.

The linkage assembly 350 further comprises a roller component 352 positioned between and rotatably attached to the first and second auxiliary armatures 324, 360 via the second bolt member 362. The roller component 352 is positioned adjacent the additional floor 128 of the slide-out housing 120. In one embodiment, the roller component 352 freely rotates between the second bolt members 362. The length of the roller component 354 approximately defines a width 354 of the linkage assembly 350.

It should be appreciated that the linkage assembly 350 may comprise additional solenoid, pneumatic, or hydraulic mechanisms positioned between or adjacent to the illustrated solenoid, pneumatic, or hydraulic mechanisms 320 without departing from the scope of the present invention. In one aspect, additional solenoid, pneumatic, or hydraulic mechanisms may be utilized to increase the lifting strength of the linkage assembly 350.

FIG. 6A illustrates the linkage assembly 350 in a compressed position such that the slide-out housing 120 is in the lifted orientation as illustrated in FIG. 3C. As illustrated, when the pistons 322 plunge out of the solenoid, pneumatic, or hydraulic mechanisms 320, the armatures 324, 360 rotate at first and second armature joints 356, 358 so as to upwardly push the roller component 352 against the additional floor 128 of the slide-out housing 120, which tends to lift the slide-out housing 120 into the lifted orientation above the main housing floor 112.

FIG. 6B illustrates the linkage assembly 350 in a decompressed position such that the slide-out housing 120 is in the lowered orientation as illustrated in FIG. 3A. In one aspect, as illustrated in FIG. 6B, when the pistons 322 plunge into the solenoid, pneumatic, or hydraulic mechanisms 320, the armatures 324, 360 rotate at first and second armature joints 356, 358 so as to allow the slide-out housing 120 to slowly drop into the lowered orientation, which aligns the additional floor 128 of the slide-out housing 120 with the main housing floor 112. Additionally, it should be appreciated by those skilled in the art that the linkage assembly 350 may be adapted to comprise a scotch yoke so as to prevent binding of the armatures 324, 360 during operation. As is generally known in the art, a scotch yoke comprises a curved slot that is adapted to inhibit binding.

Advantageously, the various embodiments of the above-described cam assembly 170 offer a unique structure for lifting and lowering slide-out housings 120 for recreational vehicles 100 during deployment and retraction. For example, the illustrated slide-out housing 120 can be lifted or lowered with approximately a quarter-turn of the cam member 172. The ease and manner in which the cam member 172 of the cam assembly 170 can be rotated for lifting and lowering the slide-out housing 120 reduces the stress on the armature assembly 180 by reducing the vertical weight component of the slide-out housing 120 supported by the armature assembly 180 during deployment and retraction. In one aspect, the illustrated cam assembly 170 accomplishes this by distributing the vertical weight component of the slide-out housing 120 along the length of the cam member 172. Reduced deployment/retraction stresses can improve the structural integrity and reliability of the armature assembly 170.

In addition, the ease and manner in which the cam member 172 of the cam assembly 170 can be rotated for lifting and lowering slide-out housing 120 has further reduced the need for inclined surfaces formed at the lower edge of the opening in the main housing and for wheels or rollers attached to the lower inside edge of the slide-out as previously described with reference to conventional lifting and lowering systems. This reduced need has reduced the requirement for structural bends formed adjacent the opening so as to accommodate the sloped surface of the incline. Moreover, this reduced need allows the structural integrity of the lower edge of the opening to be properly supported for structural soundness as opposed to the previously described conventional lifting and lowering systems, which use welded components that are inadequately supported and tend to weaken over time.

Figure 7A:
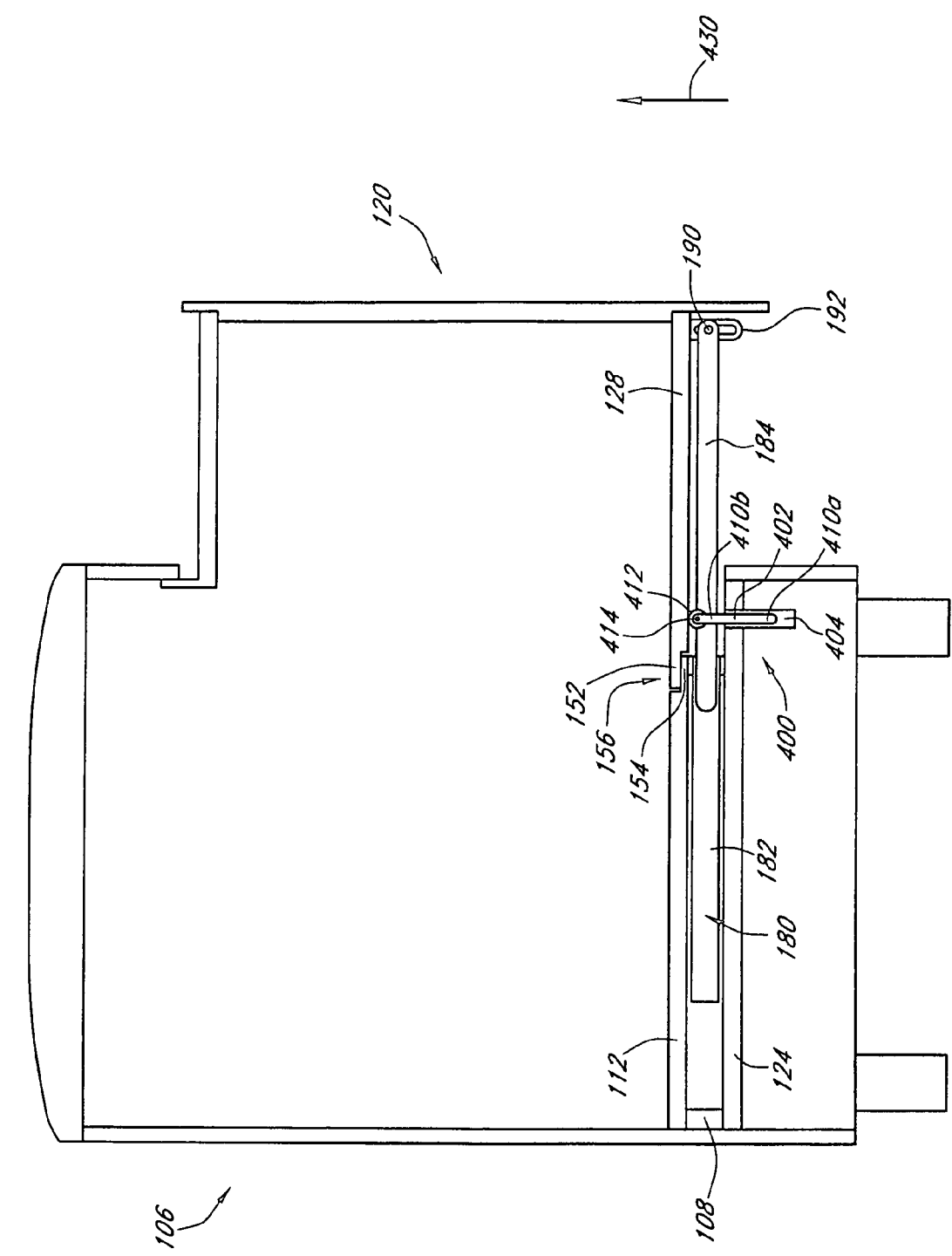
FIGS. 7A-7D illustrate another embodiment of a process for lifting and lowering the slide-out housing using a vertical actuating mechanism.
Figure 7B:
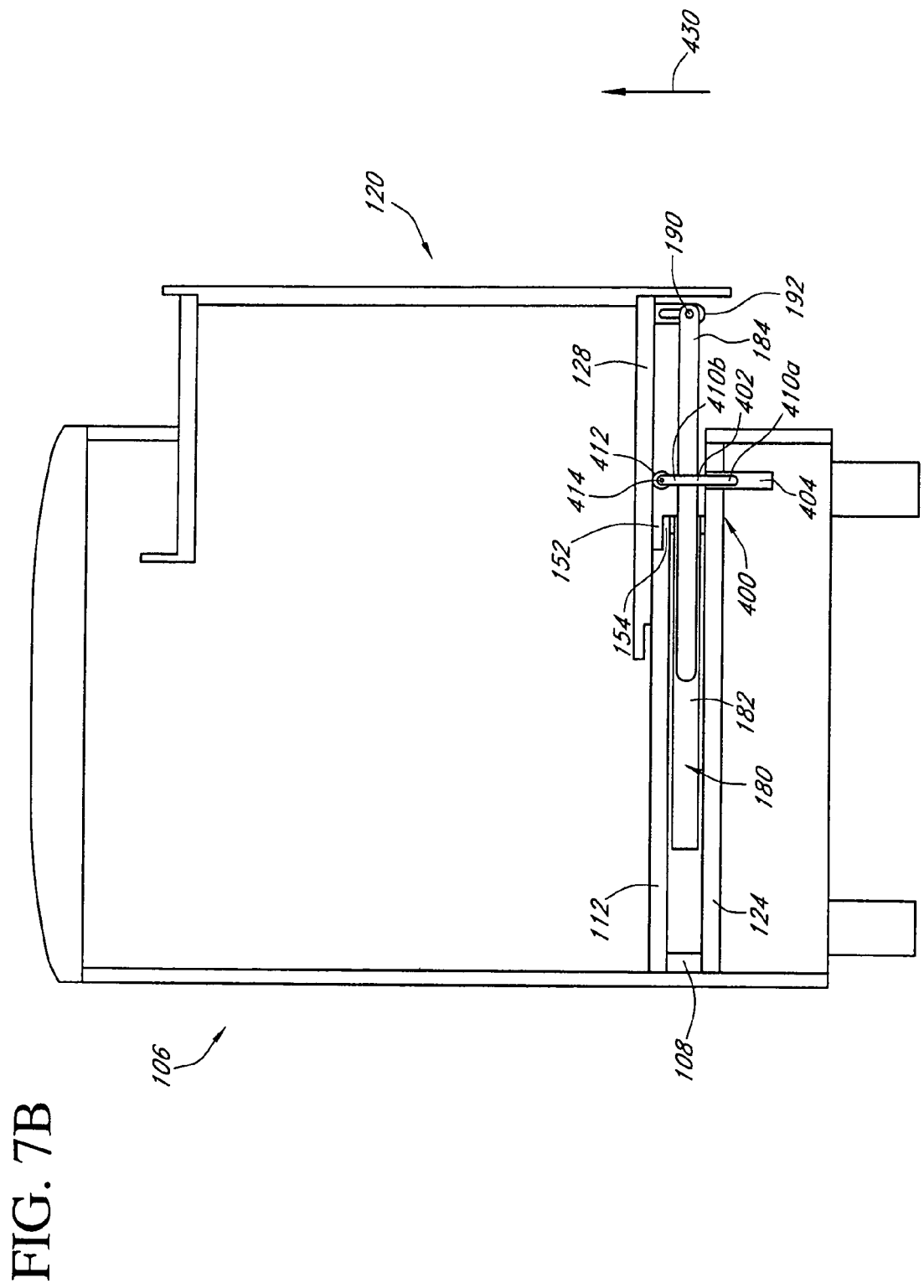
Figure 7C:
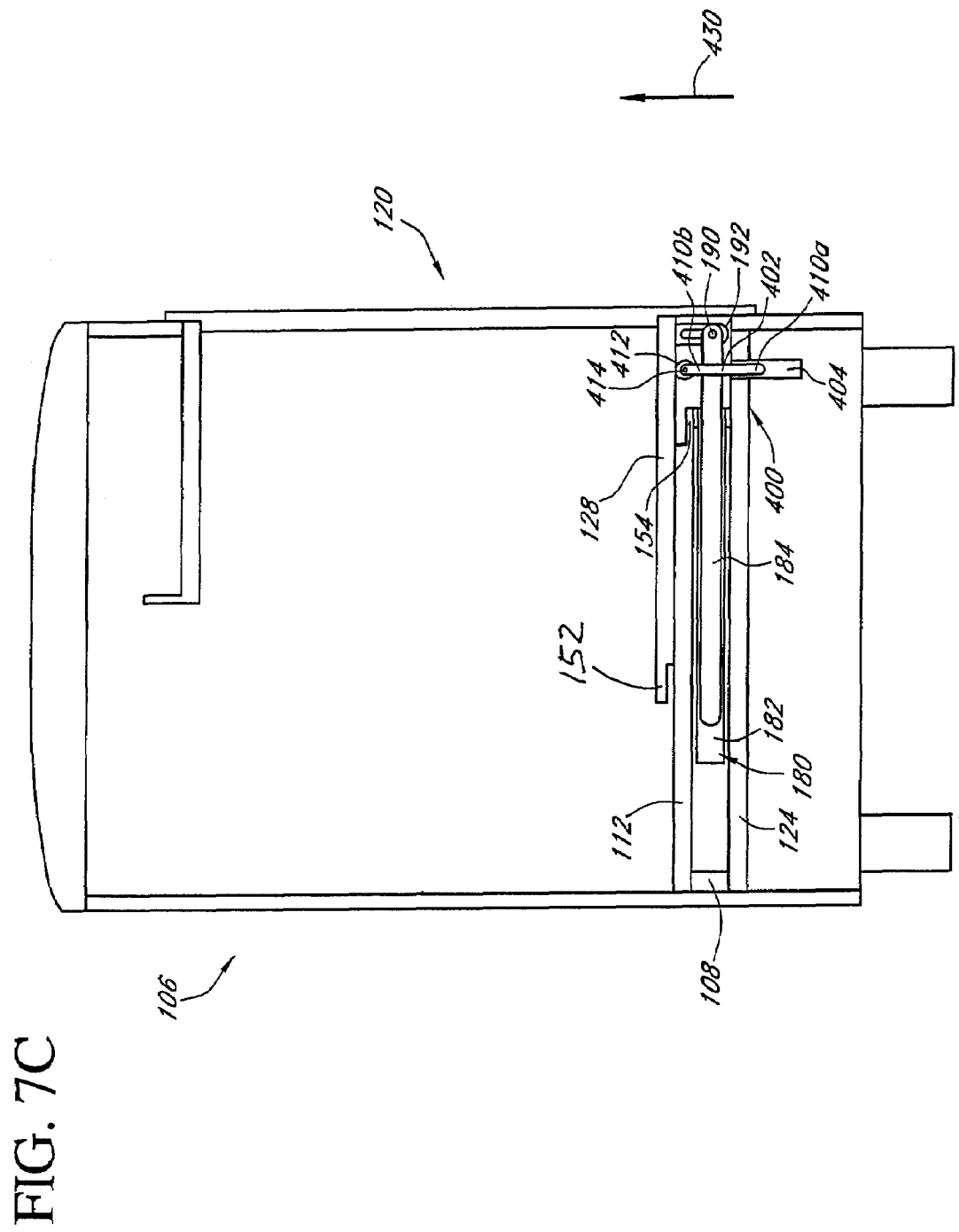

FIGS. 7A-7C illustrate another embodiment of a process for lifting the slide-out housing 120 prior to retraction using a vertical actuating mechanism 400. However, it should be appreciated that the illustrated process may also be ordered in reverse from FIG. 7C to FIG. 7A for lowering the slide-out housing 120 after deployment using the vertical actuating mechanism 400.

In one embodiment, as illustrated in FIG. 7A, the vertical actuating mechanism 400 may be used to lift and lower the slide-out housing 120 during retraction and deployment. As illustrated, the vertical actuating mechanism 400 comprises a telescoping armature 402, such as a piston, slidably attached within an armature housing 404 that is mounted to the vehicle frame 108. In one aspect, a first end 410a of the telescoping armature 402 extends within the armature housing 404 so as to lower the slide-out housing 120 after deployment such that the additional floor 128 of the slide-out housing 120 is substantially aligned with the main housing floor 112. It should be appreciated that the armature housing 404 may be mounted to the main housing floor 112 or the sub-floor component 124 in a generally known manner without departing from the scope of the present invention. It should be appreciated that the vertical actuating mechanism 400 including its components may comprise various types of electrical, mechanical, pneumatic, or hydraulic devices without departing from the scope of the present invention. Also, the vertical actuating mechanism 400 may comprise a rigid metal composition that can withstand heavy weight stresses without deforming. It should be appreciated that the vertical actuating mechanism 400 may comprise various other material compositions without departing from the scope of the present invention.

In addition, the vertical actuating mechanism 400 further comprises a roller 412 rotatably mounted to a second end 410b of the telescoping armature 402 via a mounting pin 414. As illustrated in FIG. 4B, the roller 412 allows the additional floor 128 of the slide-out housing 120 to horizontally move into and out of the main housing during deployment and retraction of the slide-out housing 120. As illustrated in FIG. 7C, the telescoping armature 402 also distally extends from the armature housing 404 so as to lift the slide-out housing 120 above the main housing floor 112 prior to retraction of the slide-out housing within the main housing 106. Advantageously, as illustrated in FIG. 7B, the roller 412 provides a low resistive surface for the additional floor 128 of the slide-out housing 120 to glide upon during retraction and deployment of the slide-out housing 120. It should be appreciated that various generally known low resistive surfaces, such as one or more wheels, ball bearings, or flat lubricated gliding surfaces, may be used instead of a roller 412 without departing from the scope of the present invention.

In one embodiment, during lifting of the slide-out housing 120, the vertical actuating mechanism 400 applies an upward pushing force to the roller 412 in a generally known manner so as to vertically lift or push the additional floor 128 of the slide-out housing 120 above the main housing floor 112. Thus, lifting of the slide-out housing 120 is actuated by extending the telescoping armature 402 in an upward pushing direction 430. The applied pushing force of the telescoping armature 402 is transferred from the telescoping armature 402 to the roller 412 via the mounting pin 414 and then to the additional floor 128. Since the roller 412 is in direct contact with the additional floor 128 of the slide-out housing 120, the applied pushing force of the vertically actuating assembly 400 thereby vertically lifts the slide-out housing 120 above the main housing floor 112.

Similarly, during lowering of the slide-out housing 120, the telescoping armature 402 releases the pushing force applied to the telescoping armature 402 in a generally known manner so as to allow a downward vertical movement of the slide-out housing 120. Hence, lowering of the slide-out housing 120 is actuated by extending the telescoping armature 402 within the armature housing 404. In general, the upward pushing force of the vertical actuating mechanism 400 can be incrementally reduced so as to bias the force of gravity to thereby actuate the slide-out housing 120 into the lowered position as illustrated in FIG. 7A. Advantageously, when the slide-out housing 120 is lowered, as illustrated in FIG. 7A, the second lip section 152 couples to the complementary lip section 154 so that the additional floor 128 of the slide-out housing 120 is substantially aligned in substantially the same plane as the main housing floor 112. Furthermore, when aligned, the coupling of the floors 112, 128 forms a substantially uniform planar flooring surface 156 between the main housing 106 and the slide-out housing 120.

Figure 7D:
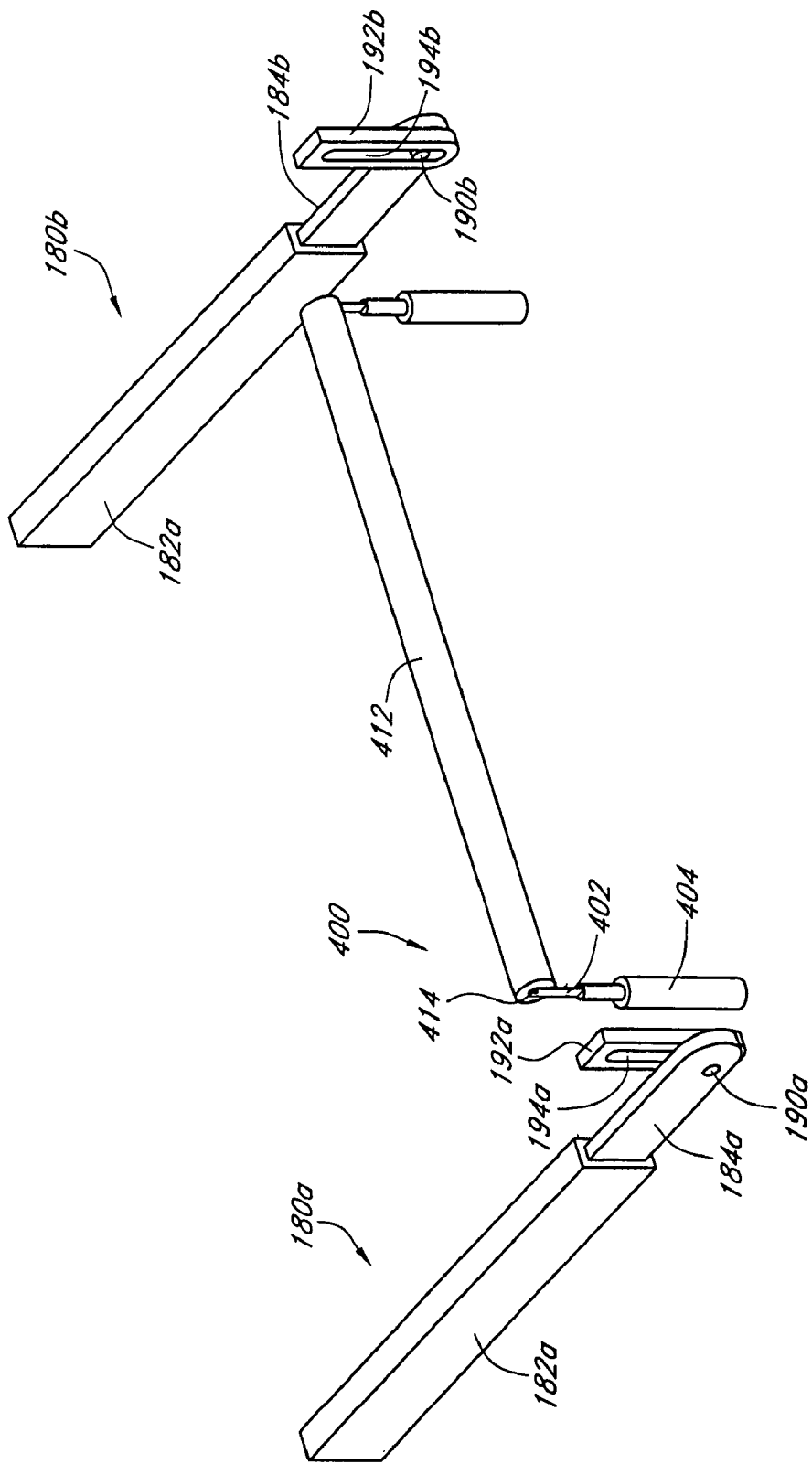

FIG. 7D illustrates a perspective view of the vertical actuating assembly 400. As illustrated the roller 412 extends along the length of the slide-out housing 120. In various embodiments, the roller 412 may comprise a length of at least the length of the additional floor 128 of the slide-out housing 120, or the roller 412 may comprise a length of at least less than the length of the additional floor 128 of the slide-out housing 120 depending on the specific application of the roller 412 to the RV 100. It should be appreciated that the vertical actuating mechanism 400 may comprise one or more separate rollers 412 each having their own telescoping armatures 402 and armature housings 404 without departing from the scope of the present invention.

FIGS. 8A-8D illustrate still another embodiment of a process for lifting the slide-out housing 120 prior to retraction using the vertical actuating mechanism 400 of FIGS. 7A-7D mounted to the front and rear sidewalls 126b, 126c of the slide-out housing 120. However, it should be appreciated that the illustrated process may also be ordered in reverse from FIG. 8D to FIG. 8A for lowering the slide-out housing 120 after deployment using the vertical actuating mechanism 400 of FIGS. 7A-7D mounted to the front and rear sidewalls 126b, 126c of the slide-out housing 120.

Figure 8A:
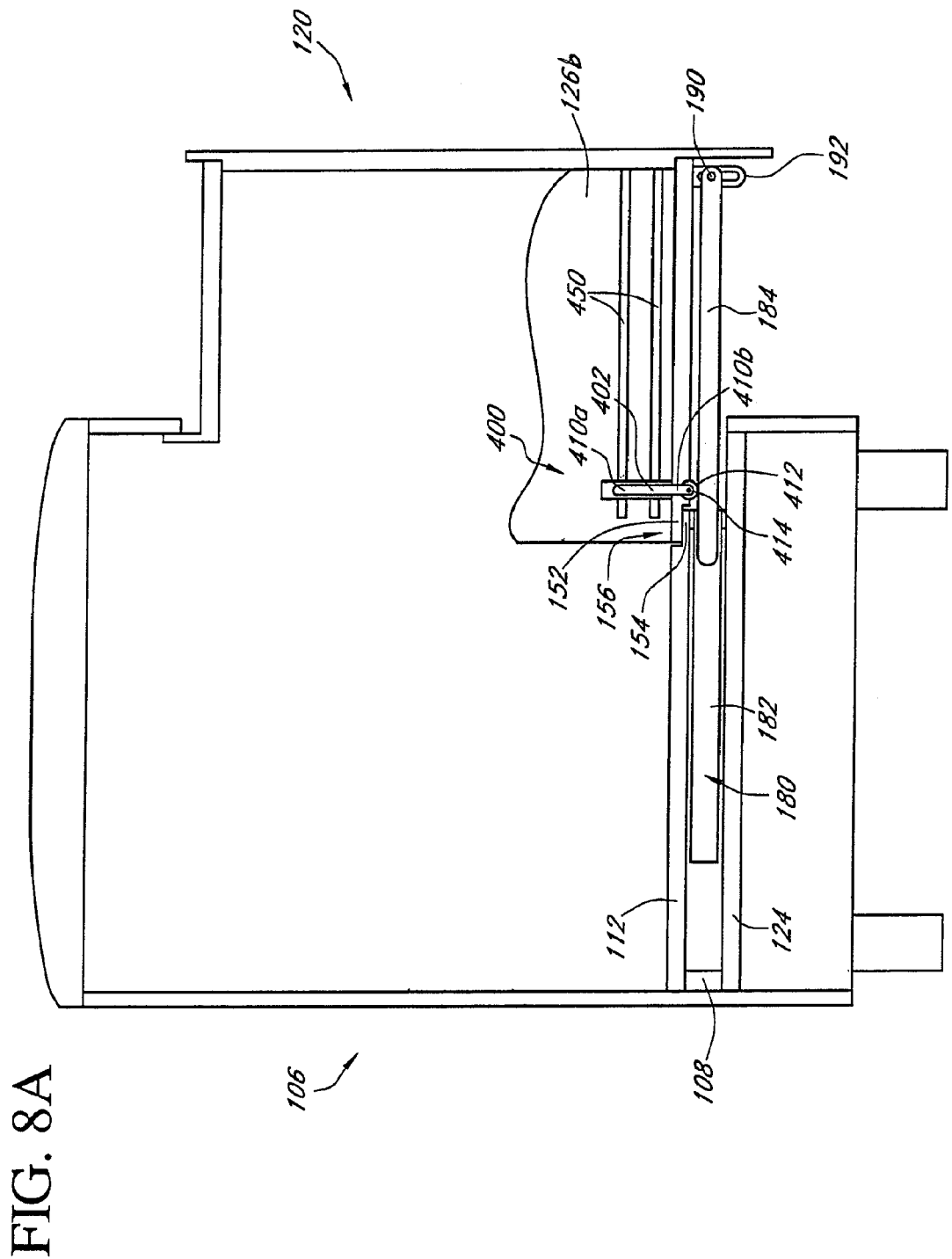
FIGS. 8A-8D illustrate still another embodiment of a process for lifting the slide-out housing using the vertical actuating mechanism.

In one embodiment, instead of mounting the vertical actuating mechanism 400 to the vehicle frame 108, main housing floor 112, or the sub-floor component 124 as described with reference to FIG. 7A, the vertical actuating mechanism 400 may be mounted to the front and rear sidewalls 126b, 126c of the slide-out assembly 120 as illustrated in FIG. 8A. In this particular embodiment, the armature housing 404 is attached to sidewalls 126b, 126c of the slide-out assembly 120 in a substantially perpendicular manner via one or more track mechanisms 450 formed on the sidewalls 126b, 126c. In general, the armature housing 404 readily moves along the tracks 450 via generally known gearing components (not shown) during retraction and deployment of the slide-out housing 120.

During lowering of the slide-out housing 120, the first end 410a of the telescoping armature 402 slidably extends within the armature housing 404 so as to lower the slide-out housing 120, as illustrated in FIG. 8A, after deployment such that the additional floor 128 of the slide-out housing 120 is substantially aligned with the main housing floor 112. During lifting of the slide-out housing 120, the first end 410a of the telescoping armature 402 slidably extends outward from the armature housing 404 so as to lift the slide-out housing 120 prior to retraction such that the additional floor 128 of the slide-out housing 120 is offset from the main housing floor 112, as illustrated in FIG. 8B.

In one embodiment, as illustrated in FIGS. 8A-8D, the roller 412 of the vertical actuating mechanism 400 is in contact with the armature 180 of the telescoping member 180 so as to readily allow horizontal movement of the slide-out housing 120 into and out of the main housing 106 during deployment and retraction. Advantageously, the roller 412 glides upon the armature 180 of the telescoping member 180 with low resistance during retraction and deployment of the slide-out housing 120.

Figure 8B:
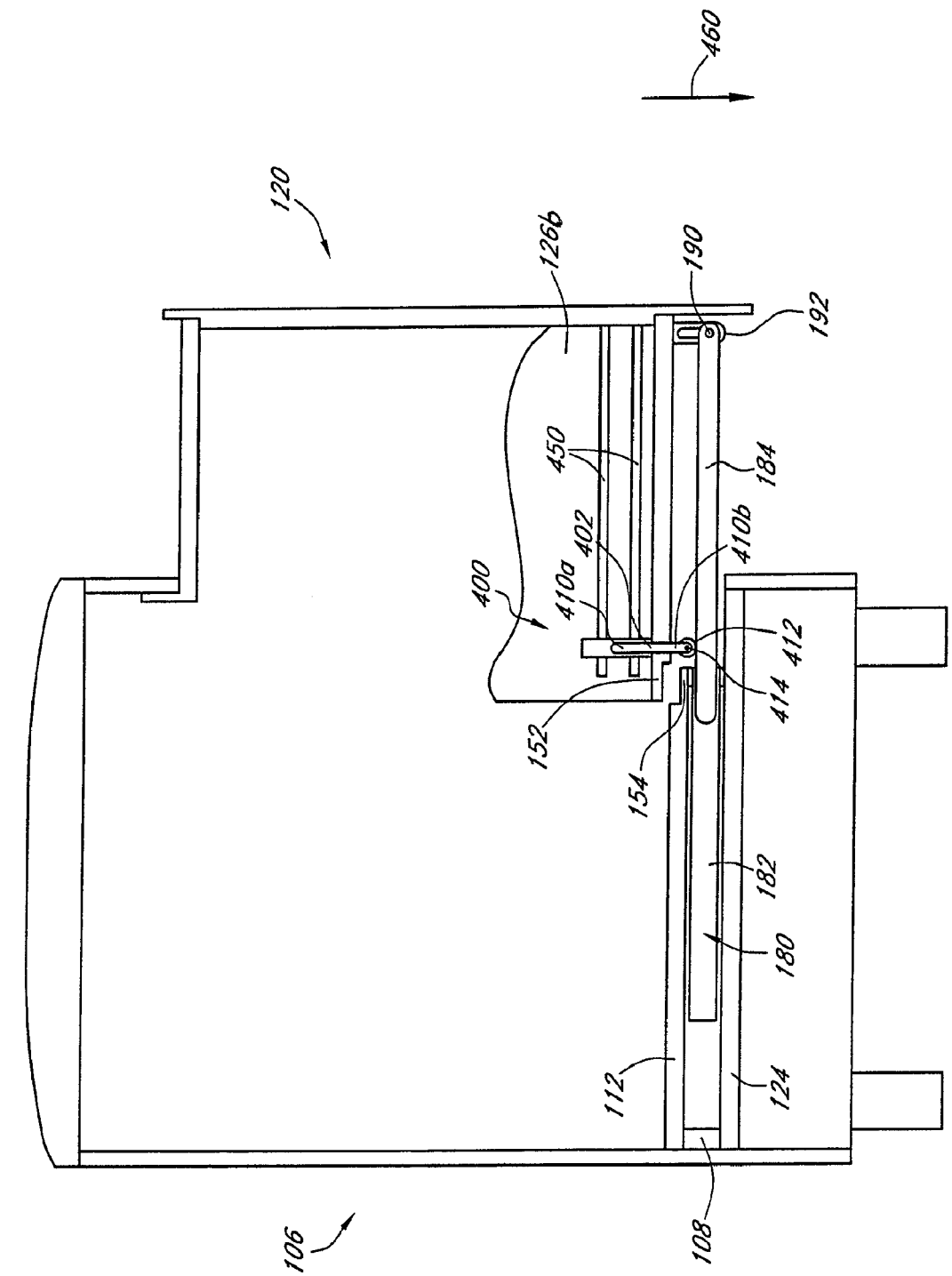
Figure 8C:
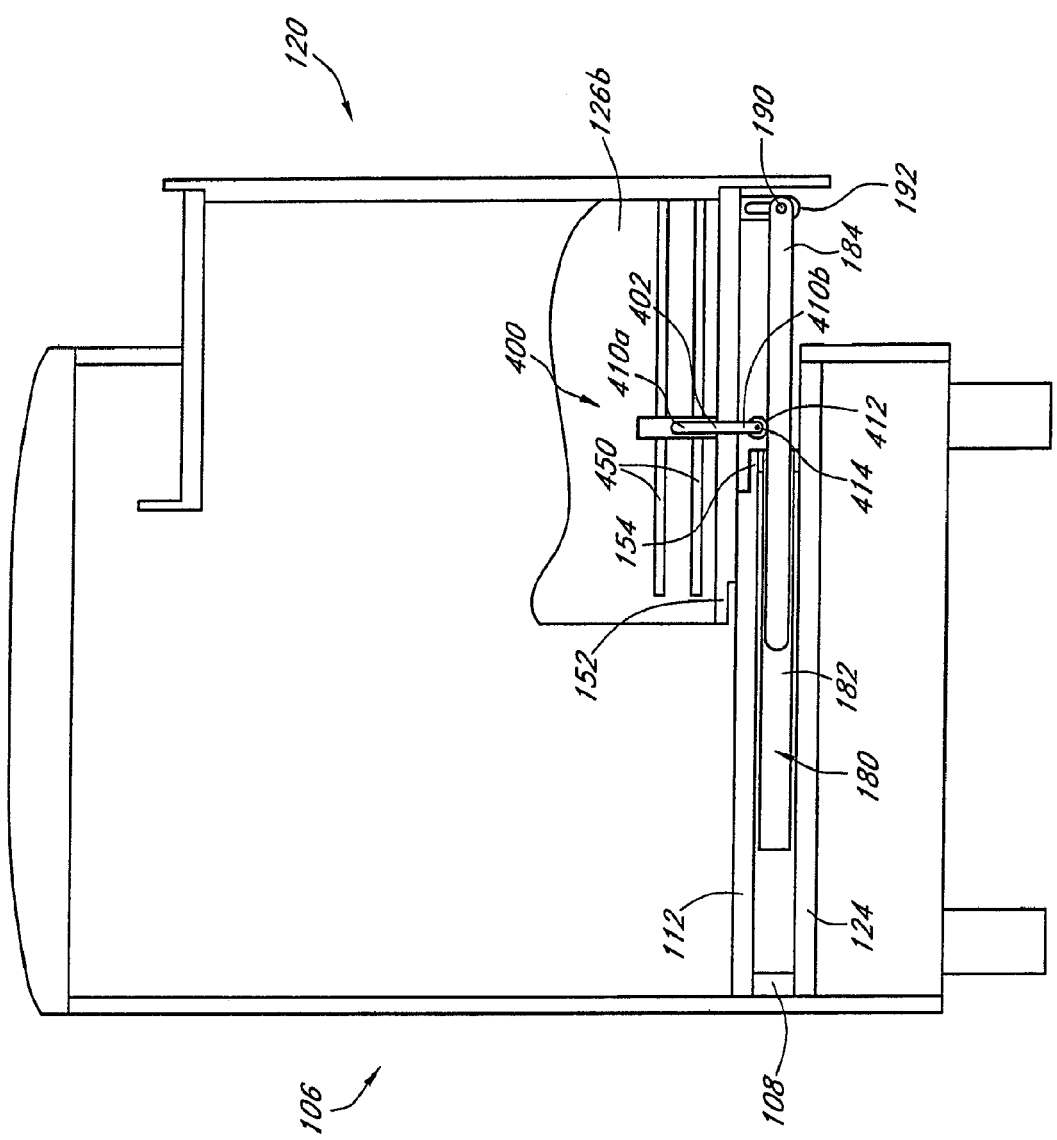
Figure 8D:
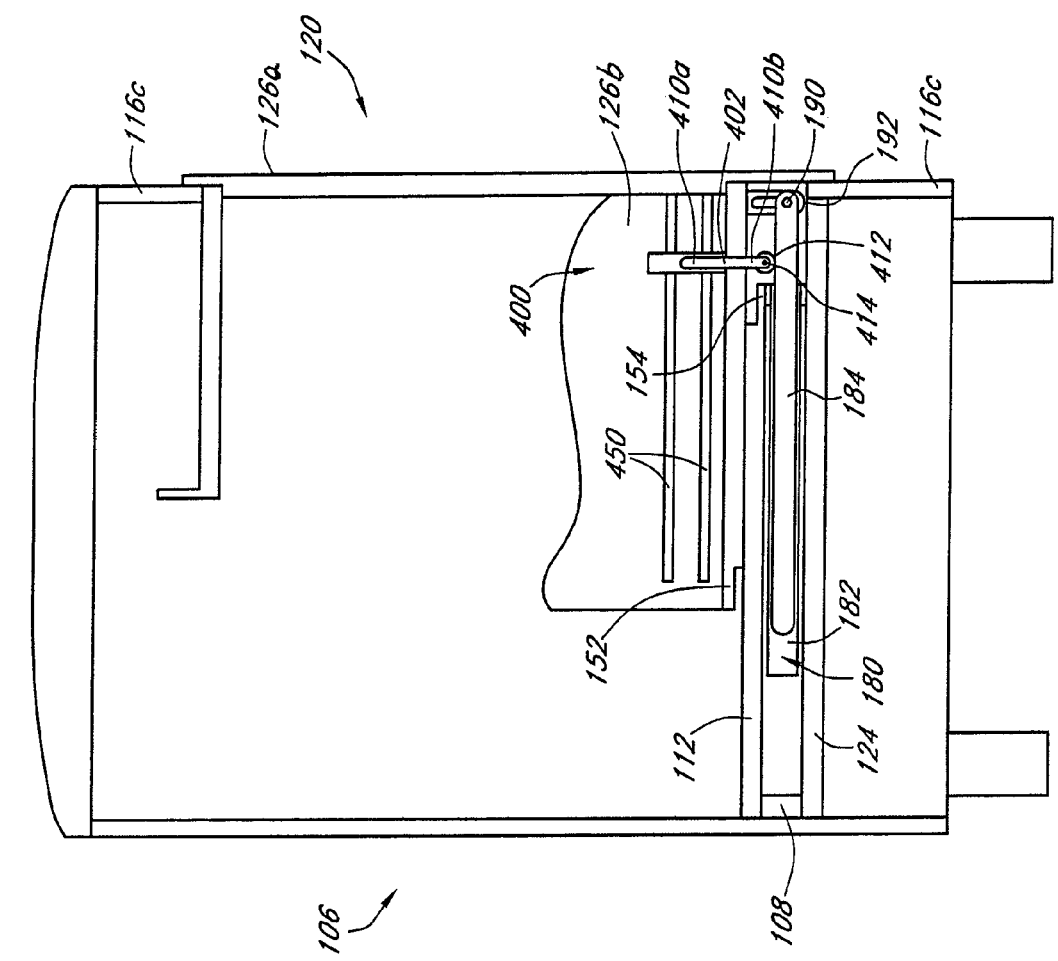

In one embodiment, during lifting of the slide-out housing 120, the vertical actuating mechanism 400 applies a downward pushing force to the roller 412 in a generally known manner so as to vertically lift or push the additional floor 128 of the slide-out housing 120 above the main housing floor 112 as illustrated in FIG. 8B. Thus, lifting of the slide-out housing 120 is actuated by extending the telescoping armature 402 in the downward direction 460. The applied pushing force of the telescoping armature 402 is transferred from the telescoping armature 402 to the roller 412 via the mounting pin 414 and then to the armature 184 of the telescoping member 180. Since the roller 412 is in direct contact with the armature 184, the applied downward pushing force of the vertically actuating assembly 400 thereby vertically lifts the slide-out housing 120 above the main housing floor 112. Once the slide-out housing 120 is lifted above the main housing floor 106, the slide-out housing 120 can be retracted within he main housing 106 as illustrated in FIG. 8C. Moreover, the slide-out housing 120 can then be retracted until the outer sidewall 126 of the slide-out housing abuts the first fixed sidewall 116c of the main housing 106 as illustrated in FIG. 8D.

Similarly, during lowering of the slide-out housing 120, the telescoping armature 402 releases the pushing force applied to the telescoping armature 402 in a generally known manner so as to allow a downward vertical movement of the slide-out housing 120. Hence, lowering of the slide-out housing 120 is actuated by extending the telescoping armature 402 within the armature housing 404. In general, the downward pushing force of the vertical actuating mechanism 400 can be incrementally reduced so as to bias the force of gravity to thereby actuate the slide-out housing 120 into the lowered position as illustrated in FIG. 8A. Advantageously, when the slide-out housing 120 is lowered, as illustrated in FIG. 8A, the second lip section 152 couples to the complementary lip section 154 so that the additional floor 128 of the slide-out housing 120 is substantially aligned in substantially the same plane as the main housing floor 112. Furthermore, when aligned, the coupling of the floors 112, 128 forms a substantially uniform planar flooring surface 156 between the main housing 106 and the slide-out housing 120.

Figure 9A:
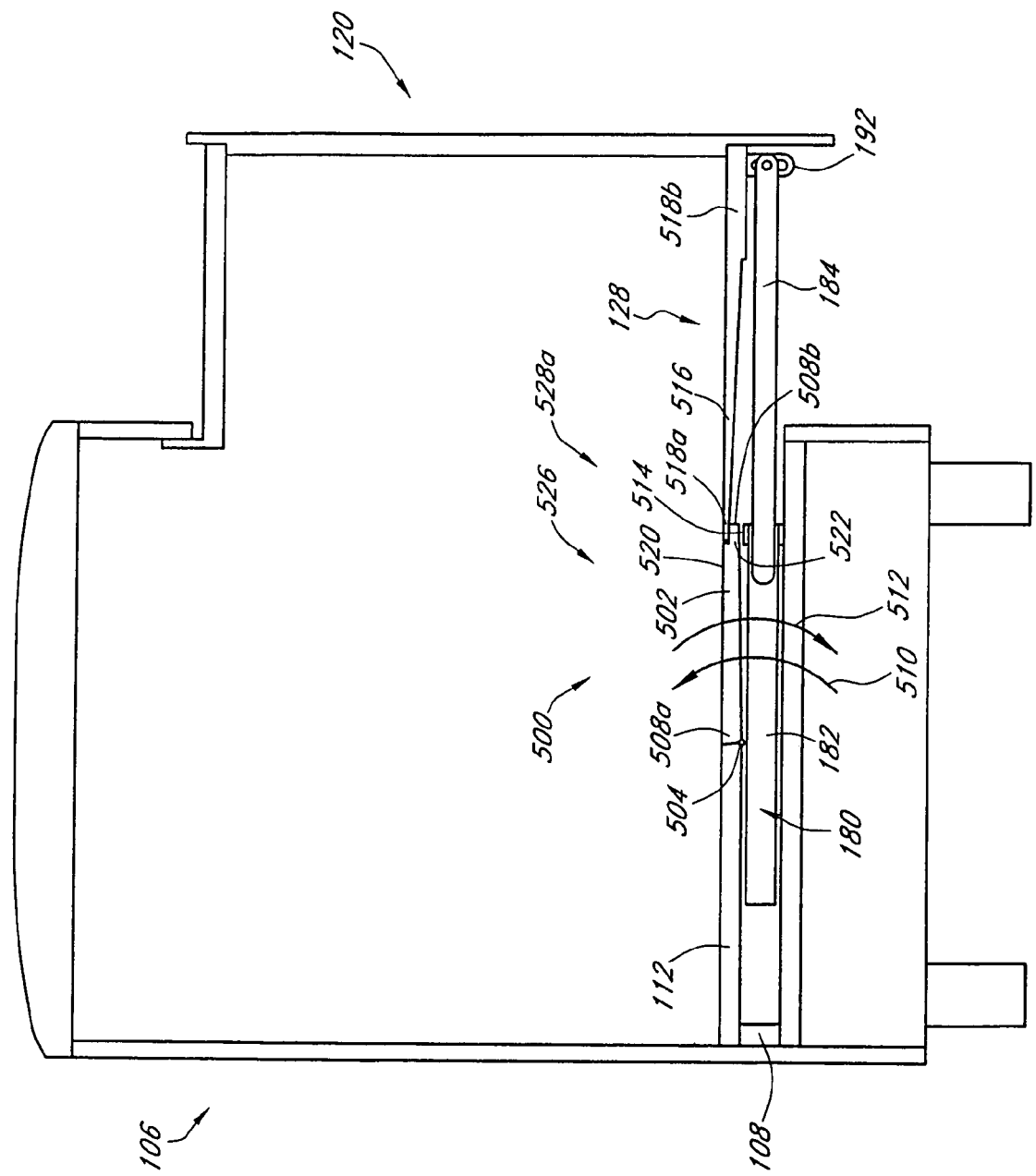
Figure 9B:
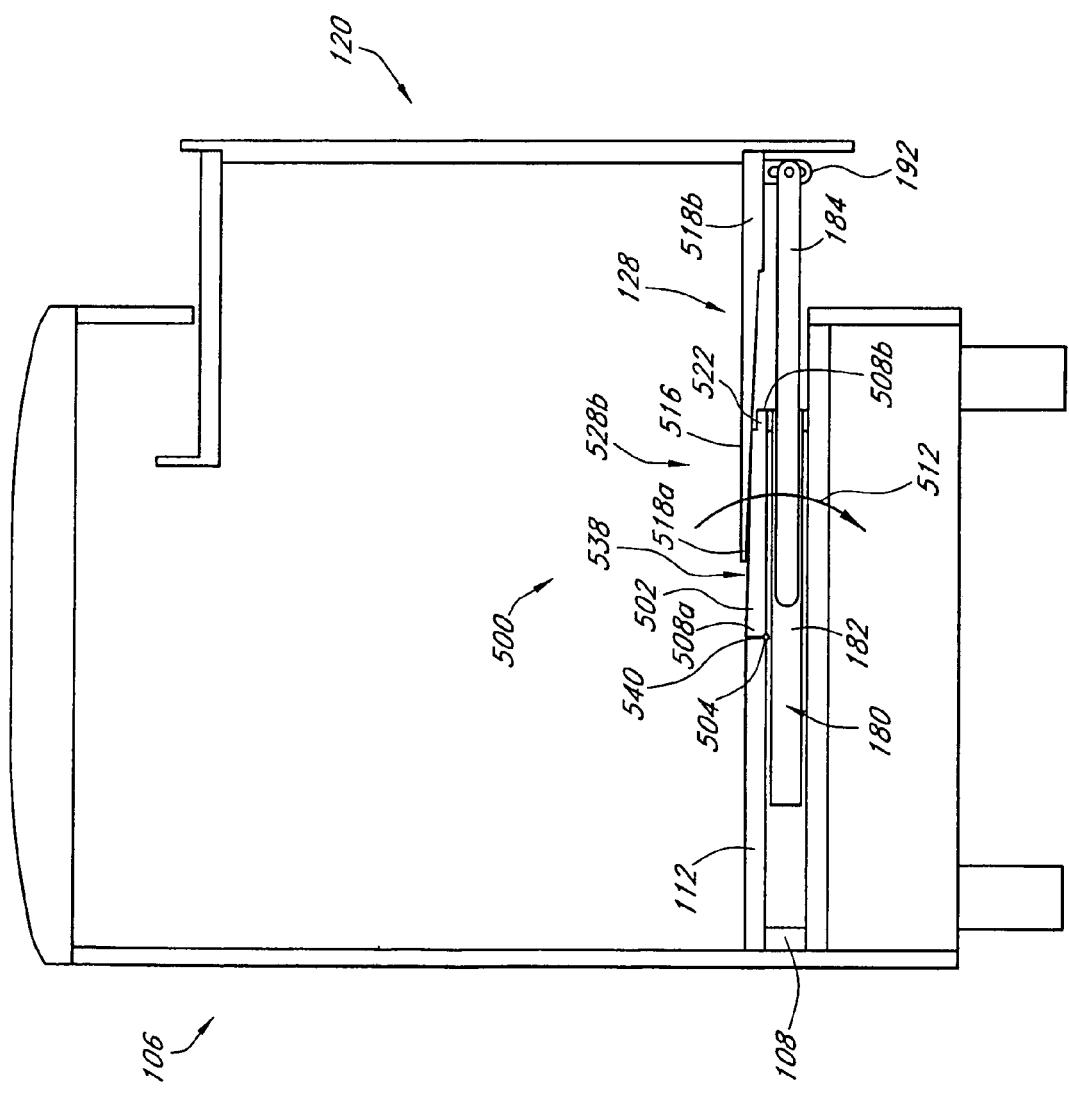
Figure 9C:
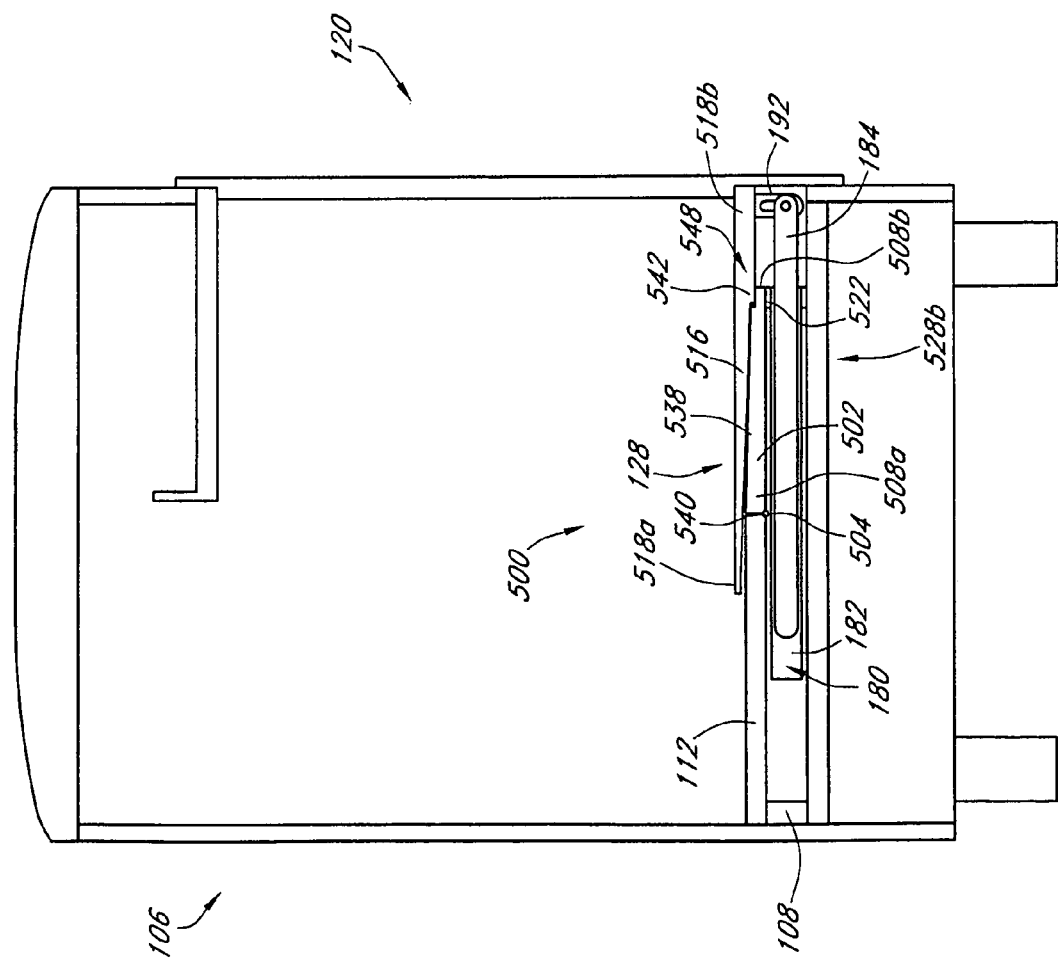

FIGS. 9A-9C illustrate still another embodiment of a process for lifting the slide-out housing 120 prior to retraction using a hinged flooring mechanism 500. However, it should be appreciated that the illustrated process may also be ordered in reverse from FIG. 9C to FIG. 9A for lowering the slide-out housing 120 after deployment using the hinged flooring mechanism 500.

In one embodiment, as illustrated in FIG. 9A, the hinged flooring mechanism 500 comprises a movable floor section 502 mounted to the main housing floor 112 via a hinge assembly 504. The hinge assembly 504 may comprise a generally known hinging device that is attached to a first end 508a of the movable floor section 502 and the main housing floor 112 in a manner so as to allow the movable floor section 502 to rotate in first and second directions 510, 512. In one aspect, the movable floor section 502 rotates in the first direction 510 to a first position 528a so that an upper surface 520 of the movable floor section 502 substantially aligns with the main housing floor 112 so as to form a substantially planar flooring surface 526 between the main housing floor 112, the additional floor 128, and the movable floor section 502. It should be appreciated that the movable floor section 502 may comprise at least a portion of the main housing floor 112 that is separate or detached therefrom and adjacent to the additional floor 128 of the slide-out housing 120.

As will be described in greater detail herein below with reference to FIGS. 9D, 9E, the hinged flooring mechanism 500 including the movable flooring section 502 may be actuated by an armature device similar to the vertical actuating mechanism 400 as described with reference to FIGS. 7A-7D. It should also be appreciated that the hinged flooring mechanism 500 may utilize various types of electrical, mechanical, pneumatic, or hydraulic devices without departing from the scope of the present invention. Also, the hinged flooring mechanism 500 may comprise a rigid metal composition that can withstand heavy weight stresses without deforming. It should be further appreciated that the hinged flooring mechanism 500 may comprise various other material compositions without departing from the scope of the present invention.

As further illustrated in FIG. 9A, the additional floor 128 of the slide-out housing 120 comprises a tapered section 516 that narrows from a first end 518a to a second end 518b of the additional floor 128. Thus, the movable floor section 502 can also rotate in the first direction 510 so that an upper ledge 522 of the movable floor section 502 abuts first end 518a of the additional floor 128 of the slide-out housing 120. Also, when the movable floor member 502 rotates in the first direction 510, the first end 508a movable floor member 502 abuts the main housing floor 112, and a second end 508b movable floor member 502 lifts above the frame member 108 so as to form a first gap 514 therebetween. As will be described in greater detail herein below, the tapered section 516 of the additional floor 128 allow the slide-out housing 120 to be retracted and deployed from the main housing 106.

As illustrated in FIG. 9B, the movable floor section 502 is rotated in the second direction 512 about the hinge assembly 504 to a second position 528b so that the upper ledge 522 is lowered below the first end 518a of the additional floor 128. In addition, when the movable floor section 502 is rotated in the second direction 512, the second end 509B of the movable floor section 502 abuts the vehicle frame 108 so as to close the first gap 514 as described with reference to FIG. 9A. Also, the first end 508a of the movable floor section 502 moves away from the main housing floor 112 so as to form a second gap 540 therebetween. As further illustrated in FIG. 9B, rotating the movable floor section 502 in the second direction 512 creates an inclined surface 538 on the movable floor section 502 to thereby allow the tapered section 516 of the additional floor to communicate therewith so as to glide along the inclined surface 538 when the slide-out housing 120 to be retracted within the main housing 106.

Advantageously, as illustrated in FIG. 9B, the inclined surface 538 define by the movable floor section 502 provides a means for lifting the additional floor 128 of the slide-out housing 120 above the main housing floor 112. It should be appreciated that various generally known guiding mechanisms, such as one or more tracks, rollers, wheels, ball bearings, or gliding surfaces, may be used to assist with guiding the additional floor 128 along the inclined surface 538 of the movable floor section 502 during retraction of the slide-out housing 120 without departing from the scope of the present invention.

As illustrated in FIG. 9C, the slide-out housing 120 can be retracted within the main housing 106 such that a second ledge 542 of the additional floor 128 communicates with the first ledge 522. In one embodiment, this forms an interlocking region 548 of the movable floor section 502 and the additional floor 128 when the slide-out housing 120 is retracted. As further illustrated in FIG. 9C, the additional floor 128 also rests on the inclined surface 538 of the movable floor 502 and supports at least a portion of the weight of the slide-out housing 120 during travel. Therefore, the interlocking region 548 in conjunction with the resting contact between the additional floor 128 and the movable floor section 502 readily secures the slide-out housing-120 to the main housing 106.

In one embodiment, during retraction of the slide-out housing 120, the telescoping member 180 applies a pulling force to the slotted member 192 so as to retract or pull the slide-out housing 120 within the main housing 106. This causes the additional floor 128 to slide along the movable floor section 502 so as to vertically lift the additional floor 128 of the slide-out housing 120 above the main housing floor 112. Thus, lifting of the slide-out housing 120 is actuated by extending the armature 184 within the device housing 182, which glides the tapered section 516 of the additional floor 128 along the inclined surface 538 of the rotated movable floor section 502. In one aspect, since the additional floor 128 is in contact with the movable floor section 502, the applied pulling force of the telescoping member 180 vertically lifts the slide-out housing 120 above the main housing floor 112.

Similarly, during deployment of the slide-out housing 120, the telescoping member 180 applies a pushing force to the slotted member 192 so as to deploy or push the slide-out housing 120 out of the main housing 106. This causes the additional floor 128 to slide along the movable floor section 502 so as to vertically lower the additional floor 128 of the slide-out housing 120 in plane with the main housing floor 112 as illustrated in FIG. 9A. Thus, lowering of the slide-out housing 120 is actuated by extending the armature 184 outward from the device housing 182, which glides the tapered section 516 of the additional floor 128 along the inclined surface 538 of the rotated movable floor section 502. In one aspect, since the additional floor 128 is in contact with the movable floor section 502, the applied pushing force of the telescoping member 180 vertically lowers the slide-out housing 120 to a position substantially aligned with the main housing floor 112. When this occurs, the movable floor section 502 rotates in the first direction 510 so that the first ledge 522 contacts or abuts the first end 518a of the additional floor 128 in a manner as previously described.

Advantageously, the movable floor section 502 rotates in the first direction 510 so that the upper surface 520 of the movable floor section 502 substantially aligns with the main housing floor 112 so as to form the substantially planar flooring surface 526 between the main housing floor 112, the additional floor 128, and the movable floor section 502. This provides a substantially flat walking surface for users of the RV 100 when the slide-out housing is deployed as illustrated in FIG. 9A.

FIG. 9D illustrates the movable floor section 502 in the first or lifted position 528a so as to define the substantially planar flooring surface 526 as described with reference to FIG. 9A. FIG. 9E illustrates the movable floor section 502 in the second or lowered position 528b so as to define the inclined surface 538 as described with reference to FIG. 9B. In one embodiment, an actuating mechanism 550 may be used to lift the movable floor section 502 into the first position 528a as illustrated in FIG. 9D, or lower the movable floor section 502 into the second position 528b as illustrated in FIG. 9E. In addition, the actuating mechanism 550 comprises an exterior housing 552 mounted to the vehicle frame 106 of the main housing 106 and an armature 554, such as a piston, attached to the movable floor section 502 via a fastener 556. In one aspect, the actuating mechanism 550 operates in a similar manner as the vertical actuating mechanism 400 as described with reference to FIGS. 7A-7D. Also, the actuating mechanism 550 may comprise a rigid metal composition that can withstand heavy weight stresses without deforming. In addition, it should be appreciated that the actuating mechanism 550 may comprise various other material compositions without departing from the scope of the present invention.

It should further be appreciated that the actuating mechanism 550 may utilize various types of electrical, mechanical, pneumatic, or hydraulic devices without departing from the scope of the present invention. For example, in one aspect, the actuating mechanism 550 may include one or more solenoid components, wherein the solenoid controlled piston 554 is adapted to induce movement of the hinged floor section 502 between the first and second positions 528a, 528b. In another aspect, the actuating mechanism 550 may include one or more hydraulic components, wherein the hydraulic controlled piston 554 is adapted to induce movement of the hinged floor section 502 between the first and second positions 528a, 528b. In still another aspect, the actuating mechanism 550 may include one or more pneumatic components, wherein the pneumatic controlled piston 554 is adapted to induce movement of the hinged floor section 502 between the first and second positions 528a, 528b.

Although the foregoing description has shown, described and pointed out the fundamental novel features of the invention, it will be understood that various omissions, substitutions, and changes in the form of the detail of the apparatus as illustrated, as well as the uses thereof, may be made by those skilled in the art, without departing from the spirit or scope of the present invention. Consequently, the scope of the invention should not be limited to the foregoing discussion, but should be defined by the appended claims.

What is claimed is:

1. A recreational vehicle comprising:

a main housing defining an interior living space having a floor located at a first level wherein the main housing defines a first wall having an opening formed therein;

an expandable room having a floor an outer wall positioned within the opening in the first wall of the main housing, wherein the expandable room is adapted to be movable between a retracted position wherein the floor of the expandable room is positioned at a second level above the first level of the floor of the main housing and the outer wall is positioned substantially adjacent the first wall of the main housing and a deployed position wherein the outer wall is extended away from the first wall of the main housing and the floor of the expandable room is positioned at a third level below the second level so as to be more planar with the first level; and a vertical movement mechanism mounted to the main housing and comprising at least one telescoping armature, comprising a piston configured to be actuated and provide vertical movement, the vertical movement mechanism further comprising a roller coupled to the at least one telescoping armature and oriented to engage and lift and lower the floor of the expandable room and to provide a rolling support for the floor of the expandable room during movements between retracted and deployed positions, such that an upward movement of the at least one telescoping armature results in vertical movement of the roller so as to exert a force having an upward component on the expandable room to thereby move the floor of the expandable room from the third level to the second level and wherein a downward movement of the at least one telescoping armature results in a downward movement of the roller so as to permit the floor of the expandable room to move from the second level to the third level.

2. The vehicle of claim 1, wherein the third level is co-planar with the first level.

3. The vehicle of claim 1, further comprising a chassis and a set of wheels to permit rolling movement of the recreational vehicle over the ground.

4. The vehicle of claim 3, wherein the recreational vehicle comprises a motorhome.

5. The vehicle of claim 1, further comprising a deployment a retraction mechanism that moves the expandable room between the first and second positions.

6. The vehicle of claim 5, wherein the deployment and retraction mechanism comprises a housing member that is mounted to the main housing and a telescoping member that is mounted to the expandable room, and wherein the telescoping member outwardly extends from the housing member so as to deploy the expandable room from the main housing, and wherein the telescoping member extends within the housing member so as to retract the expandable room into the main housing.

7. The recreational vehicle of claim 1, where the at least one telescoping armature comprises two telescoping armatures.

8. The recreational vehicle of claim 7, wherein the roller is mounted between the two telescoping armatures.

* * * * *